(12) United States Patent
Nakamura et al.

(10) Patent No.: US 9,388,773 B2
(45) Date of Patent: Jul. 12, 2016

(54) EXHAUST GAS RECIRCULATION VALVE

(71) Applicant: AISAN KOGYO KABUSHIKI KAISHA, Obu-shi, Aichi (JP)

(72) Inventors: Eiji Nakamura, Handa (JP); Yukihiro Harada, Kariya (JP); Mamoru Yoshioka, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 14/515,725

(22) Filed: Oct. 16, 2014

(65) Prior Publication Data
US 2015/0128915 A1 May 14, 2015

(30) Foreign Application Priority Data

Nov. 14, 2013 (JP) .................................. 2013-235563

(51) Int. Cl.
| F02M 25/07 | (2006.01) |
| F16K 1/36 | (2006.01) |
| F16K 1/54 | (2006.01) |
| F16K 31/04 | (2006.01) |
| F02D 41/00 | (2006.01) |

(52) U.S. Cl.
CPC ................ *F02M 25/079* (2013.01); *F16K 1/36* (2013.01); *F16K 1/54* (2013.01); *F16K 31/04* (2013.01); *F02D 41/0077* (2013.01); *Y02T 10/121* (2013.01)

(58) Field of Classification Search
CPC . F02M 25/07; F02M 25/077; F02M 25/0787; F02M 25/079; F02M 25/0794; F02M 25/0773; F02D 41/0077; F02D 41/0047; F16K 1/36; F16K 1/38; F16K 1/42; F16K 1/54

USPC .................... 123/568.11, 188.4, 188.2, 188.8
See application file for complete search history.

(56) References Cited

U.S. PATENT DOCUMENTS

| 5,503,131 | A | 4/1996 | Ohuchi | |
| 6,041,764 | A | 3/2000 | Nemoto et al. | |
| 6,168,134 | B1 * | 1/2001 | Ruth | F02M 25/079 123/568.27 |
| 6,295,975 | B1 * | 10/2001 | Yew | F02M 25/0772 123/568.2 |
| 6,453,891 | B2 * | 9/2002 | Kato | F16K 31/04 123/568.24 |
| 6,484,705 | B2 * | 11/2002 | Bircann | F02M 25/0792 123/568.11 |
| 6,672,293 | B1 * | 1/2004 | Yokoyama | F02M 25/0773 123/568.21 |

(Continued)

FOREIGN PATENT DOCUMENTS

| JP | A-7-83122 | 3/1995 |
| JP | A-11-13558 | 1/1999 |
| JP | A-2008-202516 | 9/2008 |

*Primary Examiner* — Grant Moubry
(74) *Attorney, Agent, or Firm* — Oliff PLC

(57) ABSTRACT

An EGR valve includes a housing formed with a passage, a valve seat provided in the passage, a valve element seatable on the valve seat, a valve stem provided with the valve element at an end, and an actuator for making stroke movement of the valve stem. The valve element is moved together with the valve stem with respect to the valve seat to change an open area of a measuring section, thereby changing an opening degree of the valve element, to adjust a flow rate of EGR gas in the passage. The EGR valve has high-resolution flow-rate characteristics in a low opening region of the valve element and large flow-rate characteristics in a high opening region. The valve element and the valve seat have predetermined shapes to cause the flow-rate characteristics in the low opening region to change in a curve without a step.

5 Claims, 22 Drawing Sheets

(56) References Cited

U.S. PATENT DOCUMENTS 6,729,351 B2 * 5/2004 Bircann ............. F02M 25/0789
123/568.2

2014/0020665 A1 * 1/2014 Yoshioka ........... F02M 25/0773
123/568.24
2014/0123964 A1 * 5/2014 Hatano ..................... F16K 1/44
123/568.11

* cited by examiner

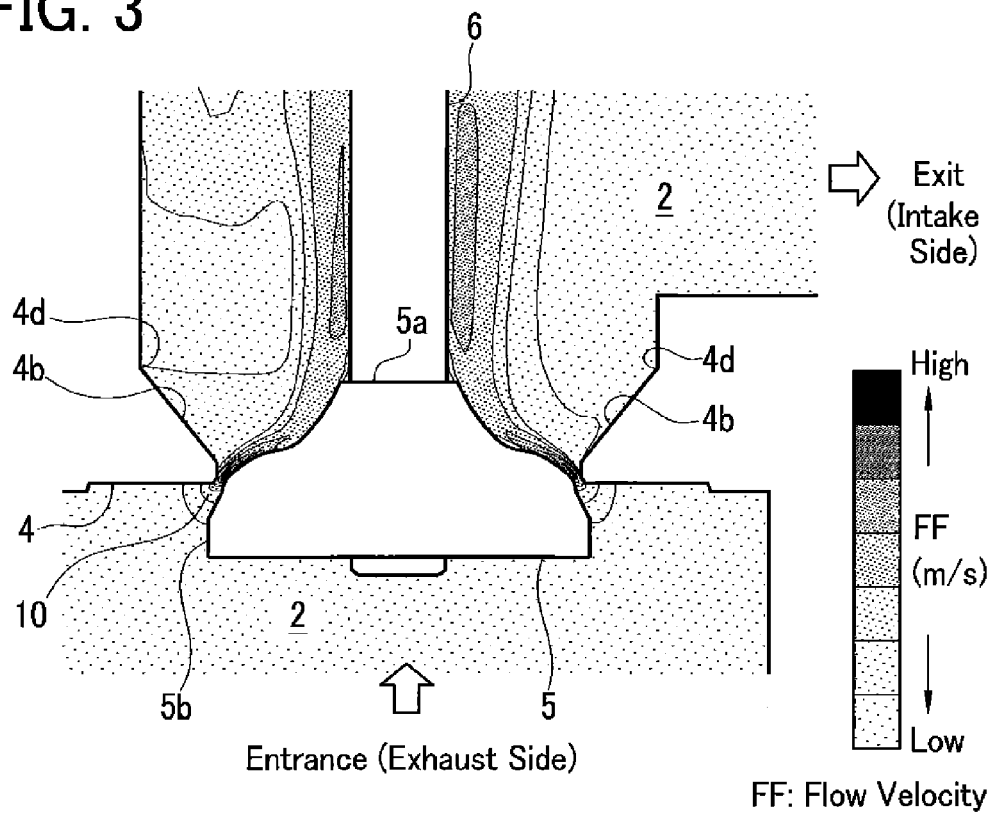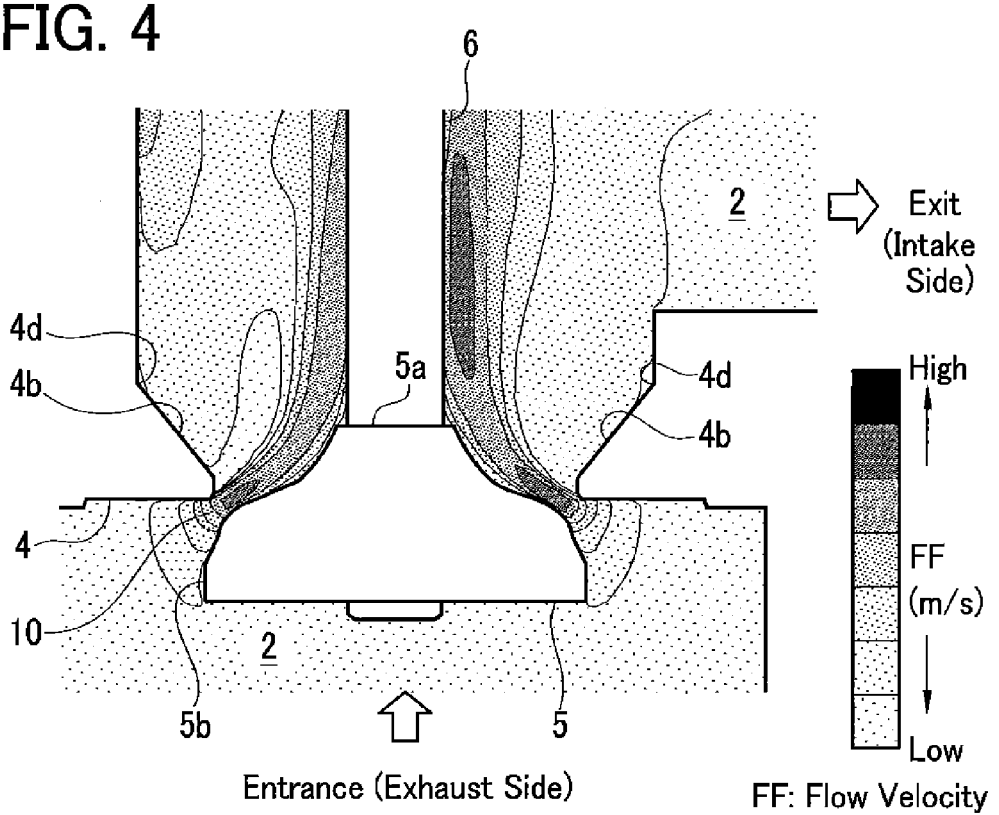

EXHAUST GAS RECIRCULATION VALVE

CROSS-REFERENCE TO RELATED APPLICATIONS

This application is based upon and claims the benefit of priority from the prior Japanese Patent Application No. 2013-235563 filed on Nov. 14, 2013, the entire contents of which are incorporated herein by reference.

BACKGROUND OF THE INVENTION

1. Field of the Invention

The present invention relates to an exhaust gas recirculation (EGR) valve to be driven by an actuator and placed in an exhaust gas recirculation passage of an exhaust gas recirculation (EGR) apparatus.

2. Related Art

As the above type of technique, for example, JP-A-2008-202516 discloses an exhaust gas recirculation vale (EGR valve) 31 of a poppet valve structure as shown in FIG. 24. This EGR valve 31 includes a housing 33 formed with a passage 32 for EGR gas, a valve seat 34 provided in some place in the passage 32, a valve element 35 provided to be seatable on the valve seat 34 to form an EGR gas measuring section between the valve element 35 and the valve seat 34, a valve stem 36 provided having one end at which the valve element 35 is provided, and an actuator 37 to perform a stroke movement of the valve element 35 together with the valve stem 36 in an axial direction. Herein, the valve seat 34 is of a circular annular form and has a valve hole 34a at the center. The valve element 35 has a nearly umbrella-like shape. By stroke movement of the valve element 35 together with the valve stem 36 caused by the actuator 37, an opening area of the measuring section, that is, an opening degree of the valve element 35 is changed to adjust a flow rate of EGR gas in the passage 32. Accordingly, the gas flow-rate characteristics of the EGR valve 31 is determined mainly by the shapes of the valve seat 34 and the valve element 35. FIG. 24 is a longitudinal sectional view of the EGR valve 31 in a fully closed state.

Meanwhile, the present applicants analyzed a flow of EGR gas in the above type EGR valve and confirmed that the shapes of the valve seat and the valve element designed in an appropriate relationship could adjust a flow rate of EGR gas at high resolution (with accuracy) in a low opening region and increase a maximum flow rate of EGR gas in a high opening region. FIG. 25 is a sectional view showing the relationship of the shapes of the valve seat 34 and the valve element 35. Herein, in FIG. 25, the valve seat 34 has an annular ring shape formed with a valve hole 34a at the center and the valve element 35 has a nearly umbrella-like shape. In FIG. 25, the valve seat 34 has a first end face 34b and a second end face 34c, each of which is planar, as upper and lower surfaces in an axial direction of the valve seat 34. The valve hole 34a is defined by an inner circumferential surface 34d about half of which is tapered toward a downstream side of EGR gas flow, that is, the inner circumferential surface 34d has a tapered shape with an inner diameter increasing toward the first end face 34b. In FIG. 25, furthermore, the valve element 35 includes a minimum-diameter portion 35a and a maximum-diameter portion 35b so that the maximum-diameter portion 35b is located more upstream in the passage 32 than the minimum-diameter portion 35a. An outer peripheral surface 35c of the valve element 35 is curved to be recessed near the minimum-diameter portion 35a and further curved to protrude near the maximum-diameter portion 35b. In the fully closed state, the valve element 35 is placed such that the minimum-diameter portion 35a is located inside in the valve hole 34a and a portion near the maximum-diameter portion 35b is in contact with an inner circumferential edge of the second end face 34c of the valve seat 34, thereby closing the valve hole 34a.

SUMMARY OF INVENTION

Problems to be Solved by the Invention

However, the aforementioned EGR valve in a conventional example has the following problems. Specifically, FIG. 26 is an explanatory view showing a CAE analysis result (an EGR gas flow velocity distribution) of EGR gas flow in the EGR valve shown in FIG. 25 located in a slight open state in a low opening region. FIG. 27 is an explanatory view showing a CAE analysis result (an EGR gas flow velocity distribution) of EGR gas flow in the EGR valve shown in FIG. 25 located in a small open state slightly larger than the slight open state shown in FIG. 26. As indicated by a scale on a right side in FIGS. 26 and 27, denser (darker) "hatching" represents a higher flow velocity of EGR gas, while a thinner (lighter) hatching represents a lower flow velocity of EGR gas (the same applies to the equivalent explanatory views mentioned later). FIG. 28 is a conceptual view showing a flow direction of EGR gas in the slight open state corresponding to FIG. 26. FIG. 29 is a conceptual view showing a flow direction of EGR gas in the small open state corresponding to FIG. 27. It is found from FIG. 26 that, in the slight open state, the EGR gas having passed through a measuring section 40 between the valve seat 34 and the valve element 35 flows at highest velocity along an inner circumferential surface of the passage 32 from the inner circumferential surface 34d of the valve seat 34 to a downstream side. It is further found from FIG. 27 that, in the small open state, the EGR gas having passed through the measuring section 40 flows at highest velocity along an outer peripheral surface of the valve stem 36 from the outer peripheral surface 35c of the valve element 35 to the downstream side. In the conventional EGR valve configured as above, in the low opening region, when the opening degree of the valve element 35 increases from the slight open state to the small open state, the main stream of the EGR gas is changed from positions close to the inner circumferential surface of the passage 32 as indicated by arrows in FIG. 28 to positions close to the center of the passage 32 as indicated by arrows in FIG. 29. This would cause a stepped change (an abrupt change) in the flow rate of EGR gas in the low opening region.

FIG. 30 is a graph showing a relationship (flow-rate characteristics) of a flow rate of EGR gas with respect to the opening degree of the EGR valve. In FIG. 30, a thick line indicates the flow-rate characteristics of the aforementioned conventional EGR valve and a thin line indicates the flow-rate characteristics of an EGR valve earlier than the conventional one. In the earlier EGR valve, as shown in FIG. 30, the resolution is low in the low opening region and the flow rate is relatively small in the high opening region. On the other hand, the conventional EGR valve provides flow-rate characteristics of high resolution (high-resolution flow-rate characteristics) in the low opening region and flow-rate characteristics of large flow rate (large flow-rate characteristics) in the high opening region. However, in the conventional EGR valve, the flow rate of EGR gas changes with a step as indicated by a dashed-dotted line circle S3 in FIG. 30. This causes a problem with an abrupt change in that range.

The present invention has been made in view of the above circumstances and has a purpose to provide an exhaust gas recirculation valve exhibiting high-resolution flow-rate characteristics in a low opening region and large flow-rate characteristics in a high opening region, the valve being capable of preventing an abrupt change in flow rate of the flow-rate characteristics in the low opening region.

Means of Solving the Problems

To achieve the above purpose, one aspect of the invention provides an exhaust gas recirculation valve including: a housing including a passage for exhaust recirculation gas; a valve seat provided in the passage, the valve seat having a valve hole including an inner circumferential surface, the inner circumferential surface including an upstream-side inner circumferential edge and a downstream-side inner circumferential edge; a valve element provided to be seated on the valve seat and configured to form a measuring section for the exhaust recirculation gas between the valve element and the valve seat, the valve element having a nearly umbrella shape and including a minimum-diameter portion and a maximum-diameter portion; and a valve stem having an end portion at which the valve element is provided, the valve element being placed inside the valve hole and provided to be movable together with the valve stem between a fully closed position where a portion of the valve element near the maximum-diameter portion is in contact with the upstream-side inner circumferential edge of the valve hole and a fully open position where the maximum-diameter portion is disposed farthest from the upstream-side inner circumferential edge in an axial direction of the valve seat, wherein the exhaust gas recirculation valve is configured to move the valve element together with the valve stem with respect to the valve seat to change an open area of the measuring section and change an opening degree of the valve element to adjust a flow rate of the exhaust recirculation gas in the passage, and the valve has flow-rate characteristics of high resolution in a low opening region of the valve element and flow-rate characteristics of large flow rate in a high opening region, and wherein the valve element and the valve seat have predetermined shapes to cause the flow-rate characteristics in the low opening region to change in a curve without a step.

Advantageous Effects of Invention

According to the invention, an exhaust gas recirculation valve having high-resolution flow-rate characteristics in a low opening region and large flow-rate characteristics in a high opening region, thereby enabling preventing an abrupt change in flow rate of the flow-rate characteristics of exhaust recirculation gas in the low opening region.

BRIEF DESCRIPTION OF THE DRAWINGS

FIG. 3 is an explanatory view showing a CAE analysis result (an EGR gas flow velocity distribution) of EGR gas flow in a slight open state in a low opening region in the first embodiment;

FIG. 4 is an explanatory view showing a CAE analysis result (an EGR gas flow velocity distribution) of EGR gas flow in a small open state in a low opening region in the first embodiment;

DESCRIPTION OF EMBODIMENTS

First Embodiment

A detailed description of a preferred embodiment of an exhaust gas recirculation valve (EGR valve) embodying the present invention will now be given referring to the accompanying drawings.

Figure 1:
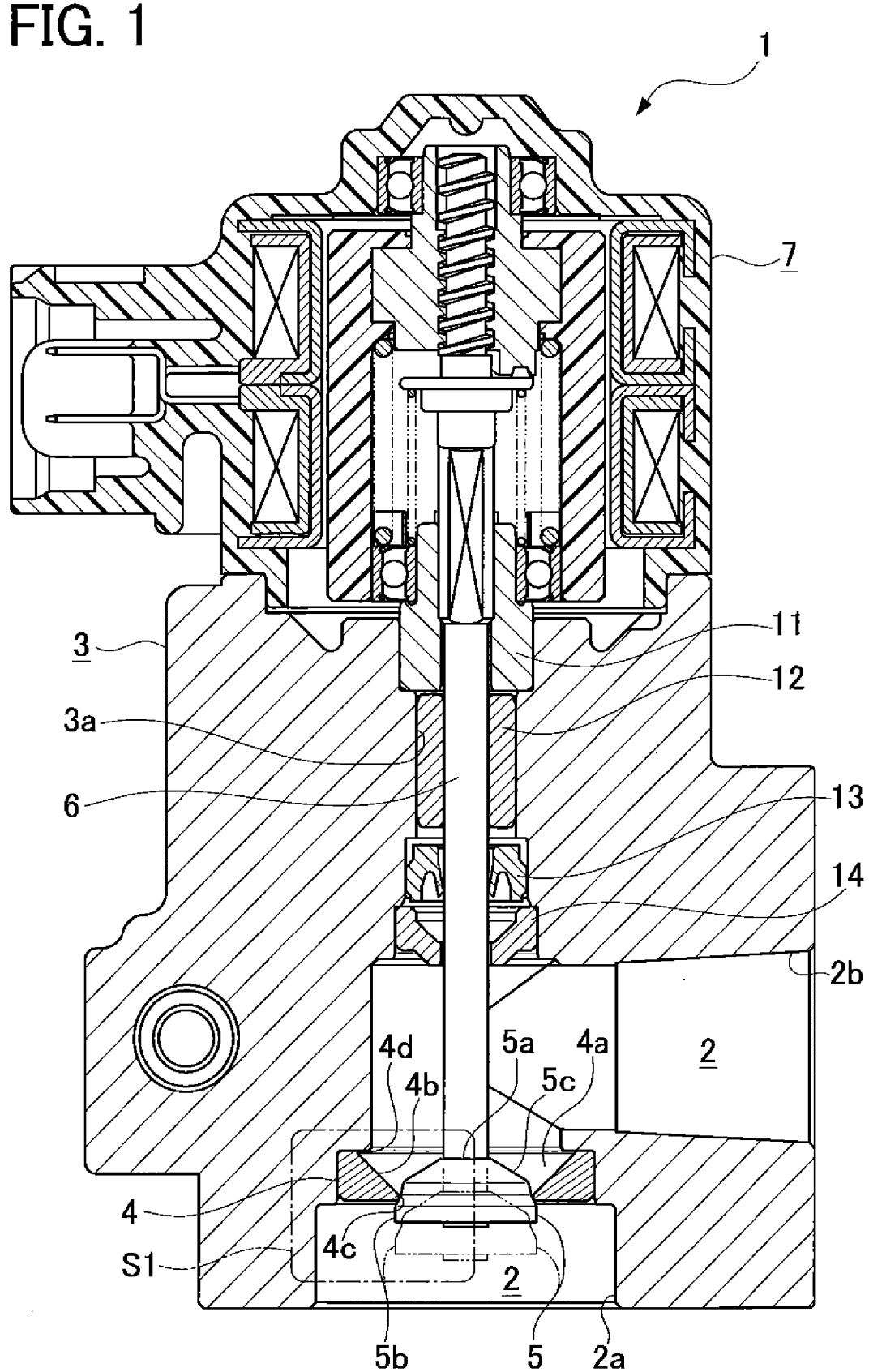
FIG. 1 is a front sectional view showing an EGR valve in a fully closed state in a first embodiment.
Figure 2:
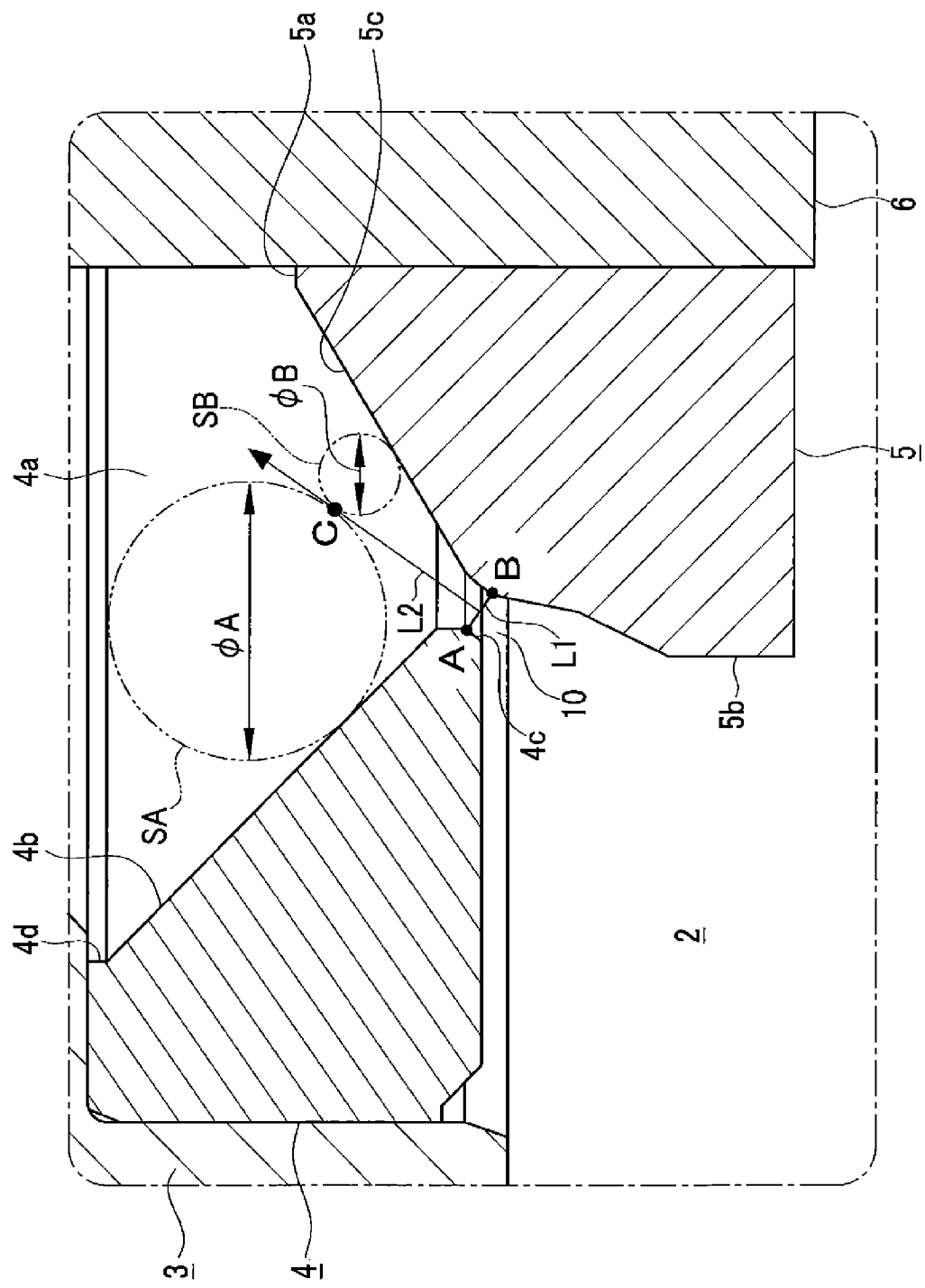
FIG. 2 is an enlarged sectional view showing a part surrounded by a dashed-dotted line rectangle in FIG. 1 in the first embodiment.

FIG. 1 is a front sectional view of an EGR valve 1 in a fully closed state. FIG. 2 is an enlarged sectional view of a part surrounded by a dashed-dotted line rectangle S1 in FIG. 1. The EGR valve 1 is placed in an EGR passage (not shown) through which part of exhaust gas discharged from an engine is allowed to return as EGR gas to an intake passage (not shown). This valve 1 is used to adjust the flow rate of the EGR gas.

As shown in FIG. 1, the EGR valve 1 has a poppet valve structure and includes a housing 3 made of metal and formed with a passage 2 for EGR gas, a valve seat 4 provided in some place in the passage 2, a valve element 5 provided to be seatable on the valve seat 4 and form an EGR gas measuring section 10 (see FIG. 2) between the valve element 5 and the valve seat 4, a valve stem 6 having one end at which the valve element 5 is provided to move the valve element 5 with respect to the valve seat 4, and an actuator 7 to drive the valve element 5 together with the valve stem 6. The actuator 7 is constituted of a DC motor and configured to reciprocally move the valve element 5 (stroke movement) together with the valve stem 6 in an axial direction. The above EGR valve 1 is operated to move the valve element 5 with respect to the valve seat 4 to change an open area of the measuring section 10 (see FIG. 2) and thereby change an opening degree of the valve element 5 in order to adjust a flow rate of EGR gas in the passage 2. In the present embodiment, the detailed explanation of the structure of the actuator 7 is omitted.

The passage 2 is formed in a shape entirely bent like a nearly hook in section in FIG. 1 in the housing 3. Both ends of the passage 2 are an entrance 2a in which EGR gas will be introduced from an exhaust passage (not shown) of an engine and an exit 2b from which EGR gas will flow into an intake passage (not shown). The valve seat 4 is made as a separate component from the housing 3 and assembled in some place (in a predetermined place) in the passage 2.

In FIG. 1, the valve stem 6 is provided to vertically extend through the housing 3 from the actuator 7 to the valve element 5. The valve element 5 is fixed to a lower end portion of the valve stem 6 and thus allowed to move into or out of contact with the valve seat 4. Between the housing 3 and the valve stem 6, there are provided a first thrust bearing 11 and a second thrust bearing 12 arranged in series to support the valve stem 6 so as to enable stroke movement of the valve stem 6. Each of the thrust bearings 11 and 12 has a nearly cylindrical shape and is fixedly fitted in a mounting hole 3a penetrating through the center of the housing 3.

Between the housing 3 and the valve stem 6, there is also provided a lip seal 13 having a nearly cylindrical shape for sealing between the housing 3 and the valve stem 6, the lip seal 13 being adjacent to the second thrust bearing 12. Under the lip seal 13, a deposit guard plug 14 is placed. These lip seal 13 and deposit guard plug 14 are press-fitted and fixed in the mounting hole 3a.

As shown in FIGS. 1 and 2, the valve element 5 includes a minimum-diameter portion 5a and a maximum-diameter portion 5b. The maximum-diameter portion 5b is positioned more upstream in the passage 2 than the minimum-diameter portion 5a. An outer peripheral surface of the valve element 5 includes a tapered portion 5c having an outer diameter gradually increasing toward the maximum-diameter portion 5b. The maximum-diameter portion 5b has a cylindrical shape. A surface between the tapered portion 5c and the maximum-diameter portion 5b is stepwise with a shoulder or raised portion.

As shown in FIGS. 1 and 2, the valve seat 4 has a valve hole 4a at the center. The valve hole 4a includes an inner circumferential surface 4b. The inner circumferential surface 4b includes an upstream-side inner circumferential edge 4c and a downstream-side inner circumferential edge 4d in an axial direction (an up-down direction in FIGS. 1 and 2) of the valve seat 4. The inner circumferential surface 4b is formed in a tapered shape inclining with an inner diameter gradually increasing to the downstream-side inner circumferential edge 4d.

In the present embodiment, the valve element 5 is placed inside the valve hole 4a and is provided to be able to reciprocally move (stroke movement) together with the valve stem 6 in the axial direction of the valve seat 4 between a fully closed position in which a portion near the maximum-diameter portion 5b comes into contact with the upstream-side inner circumferential edge 4c of the valve hole 4a as indicated by a solid line in FIG. 1 and a fully open position in which the maximum-diameter portion 5b is positioned farthest from the upstream-side inner circumferential edge 4c. This EGR valve 1 is designed to exhibit, as with the conventional example, the flow-rate characteristics of high resolution (accuracy) (high-resolution flow-rate characteristics) in a low opening region of the valve element 5 and the flow-rate characteristics of large flow rate (large flow-rate characteristics) in a high opening region. This feature will be explained in detail later.

Herein, the EGR valve 1 is designed so that the valve element 5 and the valve seat 4 have respective predetermined shapes to cause the flow-rate characteristics of EGR gas in the low opening region to smoothly change in a curve without a step. In the present embodiment, therefore, as shown in FIG. 2, in the low opening region of the valve element 5, when a line segment L1 joining one point on the inner circumferential surface 4b of the valve hole 4a and one point on the surface of the valve element 5 is a minimum distance, these points are assumed as a first point A and a second point B. Furthermore, a first circle SA is assumed to be tangent to one point C on a perpendicular bisector L2 drawn to the line segment L1 and also tangent to the tapered inner circumferential surface 4b of the valve hole 4a and a second circle SB is assumed to be tangent to the one point C on the perpendicular bisector L2 and also tangent to a surface (the tapered portion 5c) of the valve element 5. The shapes of the valve element and the valve seat 4 are designed to meet the relationship that the diameter φA of the first circle SA is equal to or larger than the diameter φB of the second circle SB. Thereby, the EGR gas passing through the measuring section 10 is caused to flow mainly along the valve element 5 and the valve stem 6.

According to the EGR valve 1 in the present embodiment, as explained above, the actuator 7 is operated to perform stroke movement of the valve element 5 together with the valve stem 6 to move the valve element 5 with respect to the valve seat 4, thereby changing the open area of the measuring section 10 to adjust a flow rate of EGR gas in the passage 2. Herein, the EGR valve 1 has the high-resolution flow-rate characteristics in the low opening region of the valve element 5 and the large flow-rate characteristics in the high opening region of the valve element 5, and the valve element 5 and the valve seat 4 are designed with respective predetermined shapes, so that the flow-rate characteristics in the low opening region can be changed smoothly in a curve without a step. Accordingly, in the low opening region, the flow rate of EGR gas will gradually change. To be concrete, in FIG. 2, the shapes of the valve element 5 and the valve seat 4 are determined to meet the relationship that the diameter φA of the first circle SA is equal to or larger than the diameter φB of the second circle SB, thereby causing the EGR gas passing through the measuring section 10 to flow along the valve element 5 and the valve stem 6. This is achieved by utilizing the property of EGR gas flow tending to be attracted to an adjacent wall. Thus, since the EGR gas is caused to flow along the valve element 5 and the valve stem 6, an abrupt change in flow direction is suppressed. Consequently, the flow rate of the flow-rate characteristics of EGR gas in the low opening region can be prevented from abruptly changing.

Figure 5:
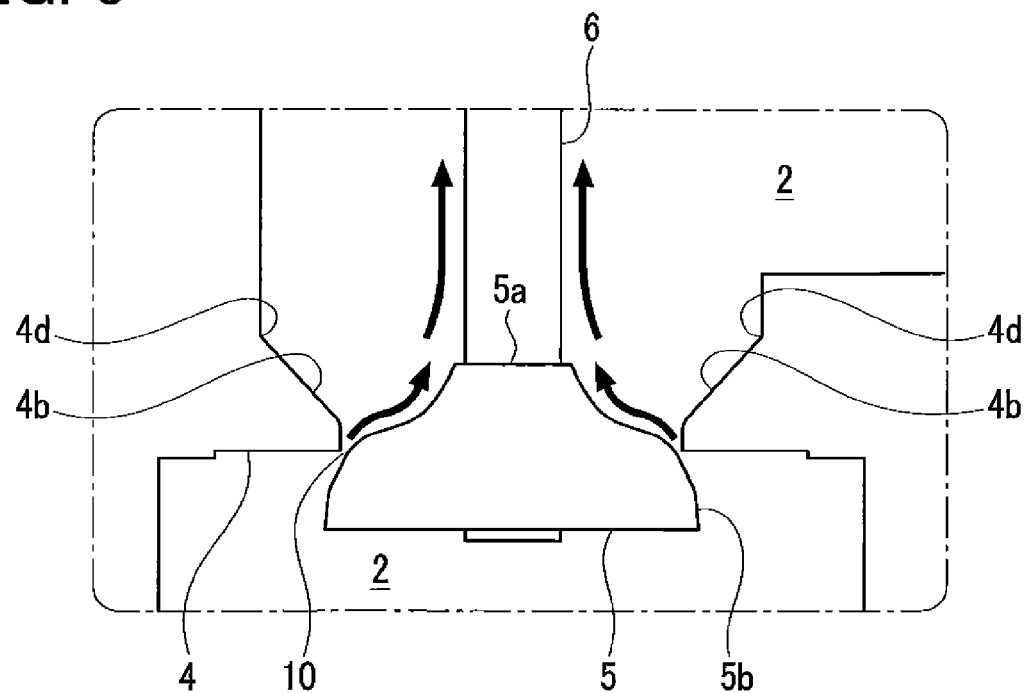
FIG. 5 is a conceptual view showing a flow direction of EGR gas in the slight open state corresponding to FIG. 3 in the first embodiment.
Figure 6:
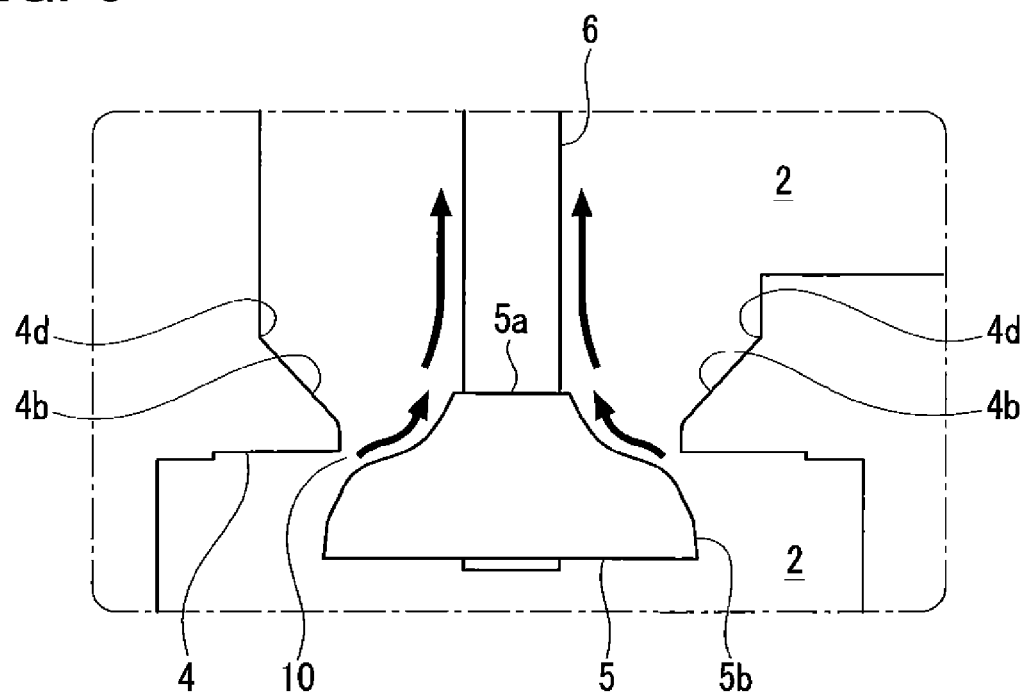
FIG. 6 is a conceptual view showing a flow direction of EGR gas in the small open state corresponding to FIG. 4 in the first embodiment.
Figure 27:
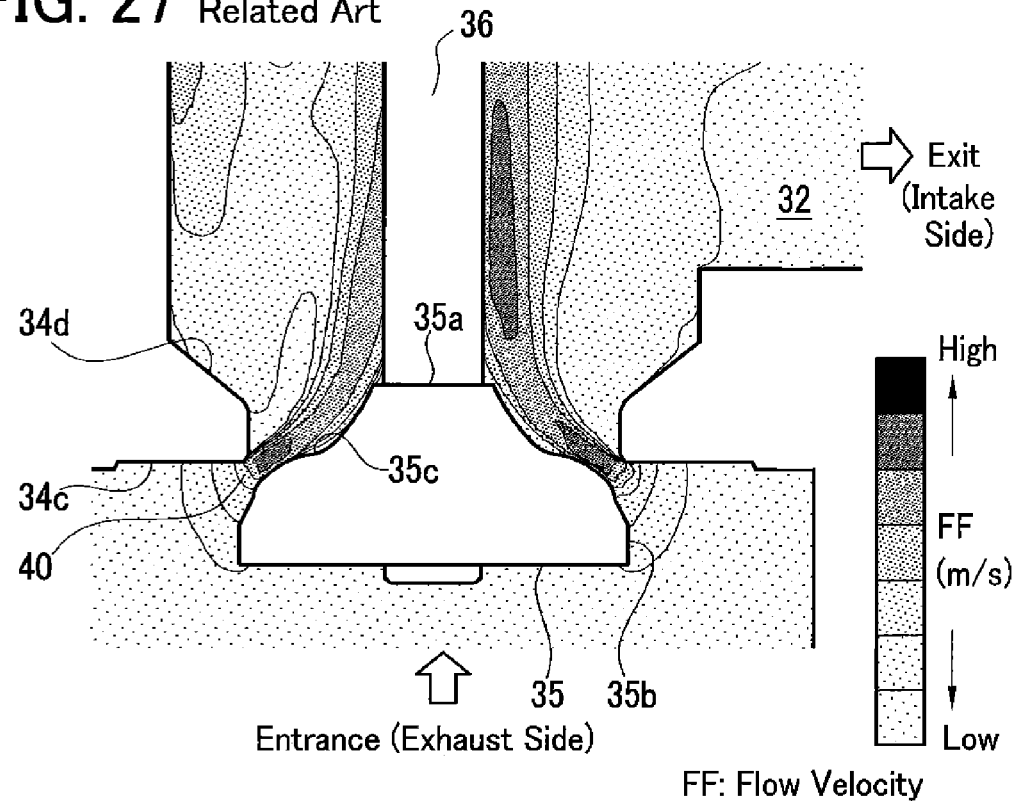
FIG. 27 is an explanatory view showing a CAE analysis result (an EGR gas flow velocity distribution) of an EGR gas flow in the small open state in the low opening region in the conventional example.
Figure 28:
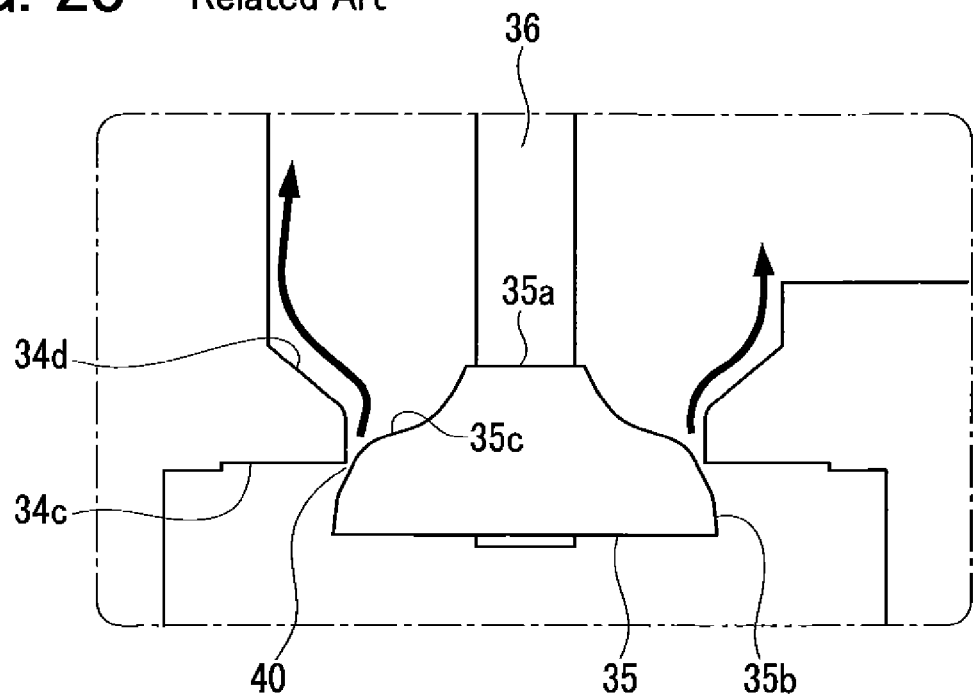
FIG. 28 is a conceptual view showing a flow direction of EGR gas in the slight open state corresponding to FIG. 26 in the conventional example.
Figure 29:
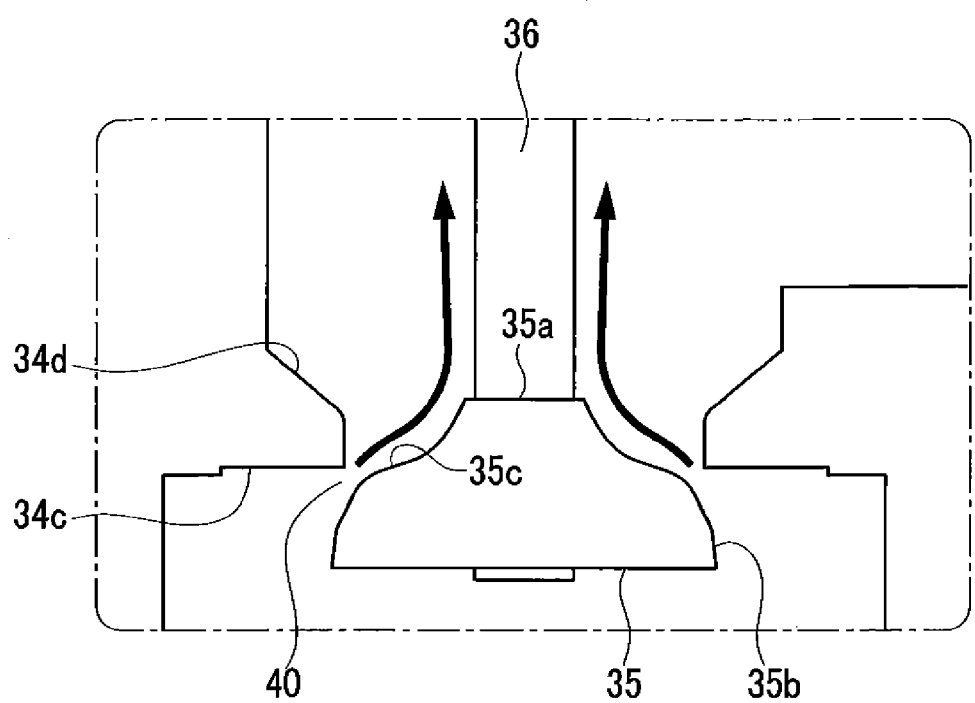
FIG. 29 is a conceptual view showing a flow direction of EGR gas in the small open state corresponding to FIG. 27 in the conventional example.
Figure 30:
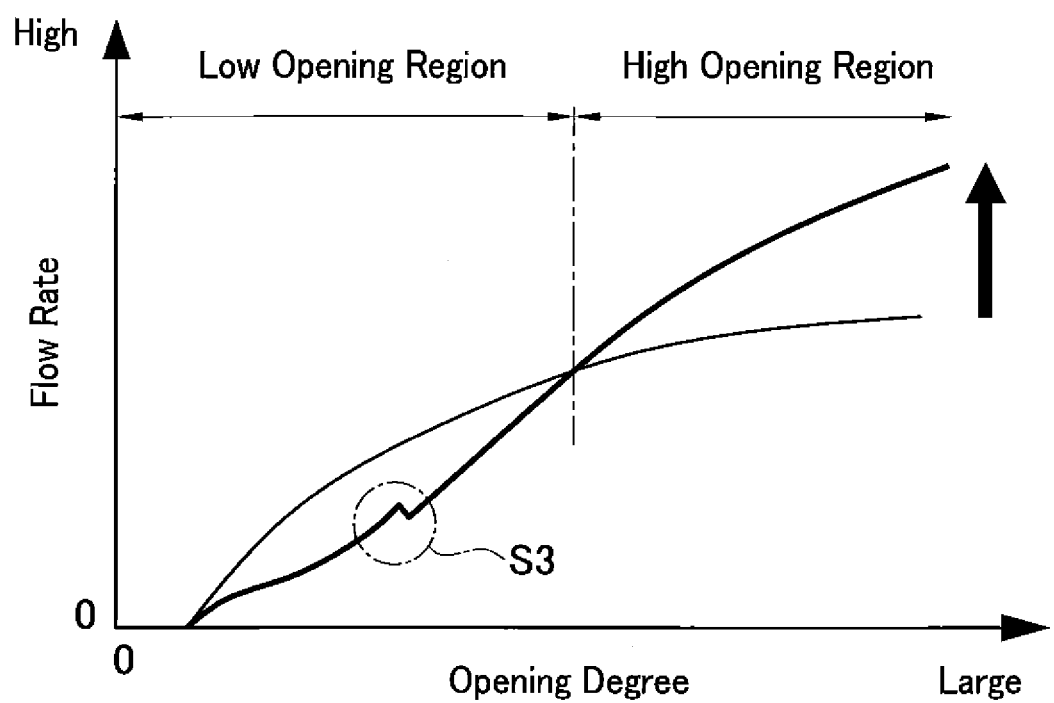
FIG. 30 is a graph showing the flow-rate characteristics of EGR gas in the EGR valve in the conventional example.

FIG. 3 is an explanatory view showing a CAE analysis result (an EGR gas flow velocity distribution) of the EGR gas flow in the EGR valve 1 in the slight open state in the low opening region in the present embodiment. FIG. 4 is an explanatory view showing a CAE analysis result (an EGR gas flow velocity distribution) of the EGR gas flow in the EGR valve 1 in the small open state in the low opening region slightly larger than the slight open state of FIG. 3. FIG. 5 is a conceptual view showing the flow direction of EGR gas in the slight open state corresponding to FIG. 3. FIG. 6 is a conceptual view showing the flow direction of EGR gas in the small open state corresponding to FIG. 4. In FIGS. 3 and 4, darker shade (hatching) represents a higher flow velocity of EGR gas (the same applies to FIGS. 14-16, 19, 20, 26, and 27). In FIG. 3, the EGR gas flow in the slight open state shows a tendency to flow at higher velocities in a zone along the valve element 5 and the valve stem 6. This tendency unchanged even in the small open state shown in FIG. 4. Specifically, as is shown by FIGS. 5 and 6, in the low opening region, the EGR gas having passing through the measuring section 10 flows mainly along the valve element 5 and the valve stem 6 toward the downstream side while maintaining a high flow velocity. In the conventional EGR valve, as compared with above, the EGR gas having passing through the measuring section 40 flows along the inner circumferential surface 34d of the valve seat 34 in the slight open state as shown in FIG. 27 and changes to flow along the valve element 35 and the valve stem 36 in the small open state as shown in FIG. 28. In the conventional EGR valve, therefore, the flow rate of EGR gas in the low opening region is apt to change abruptly.

Figure 7:
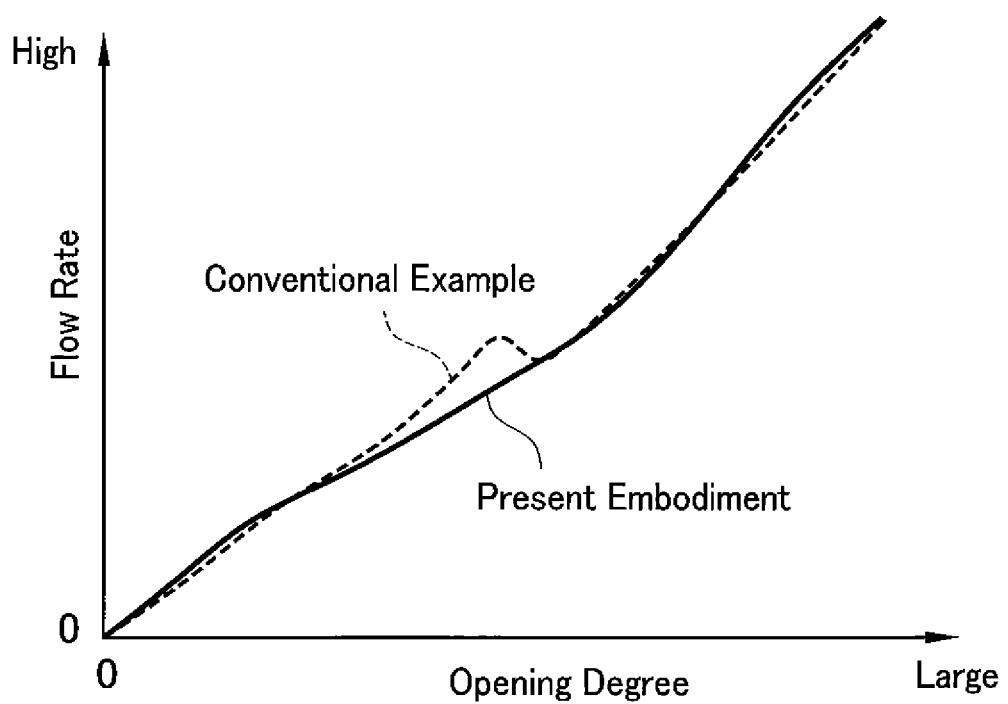
FIG. 7 is a graph showing flow-rate characteristics of EGR gas in the low opening region of the EGR valve in the first embodiment and flow-rate characteristics in a conventional example by comparison.

FIG. 7 is a graph showing the flow-rate characteristics of EGR gas in the low opening region of the EGR valve 1 in the present embodiment by comparison with the flow-rate characteristics in the conventional example. In FIG. 7, a lateral axis indicates the opening degree of the EGR valve and a vertical axis indicates the EGR gas flow rate (the same applies to FIGS. 10 and 23). As shown in FIG. 7, the flow-rate characteristics in the conventional example indicated by a broken line shows that the flow rate abruptly changes to sharply drop once in the course of increasing of the opening degree. On the other hand, the flow-rate characteristics in the present embodiment indicated by the solid line changes smoothly in a curve as a whole without an abrupt change in the course of increasing of the opening degree.

Second Embodiment

A second embodiment of the EGR valve according to the invention will be explained in detail below referring to the accompanying drawings.

Similar or identical parts in each of the following embodiments to those in the first embodiment are given the same reference signs as those in the first embodiment and their details are not repeatedly explained. Thus, the following explanation will be made with a focus on differences from the first embodiment.

Figure 8:
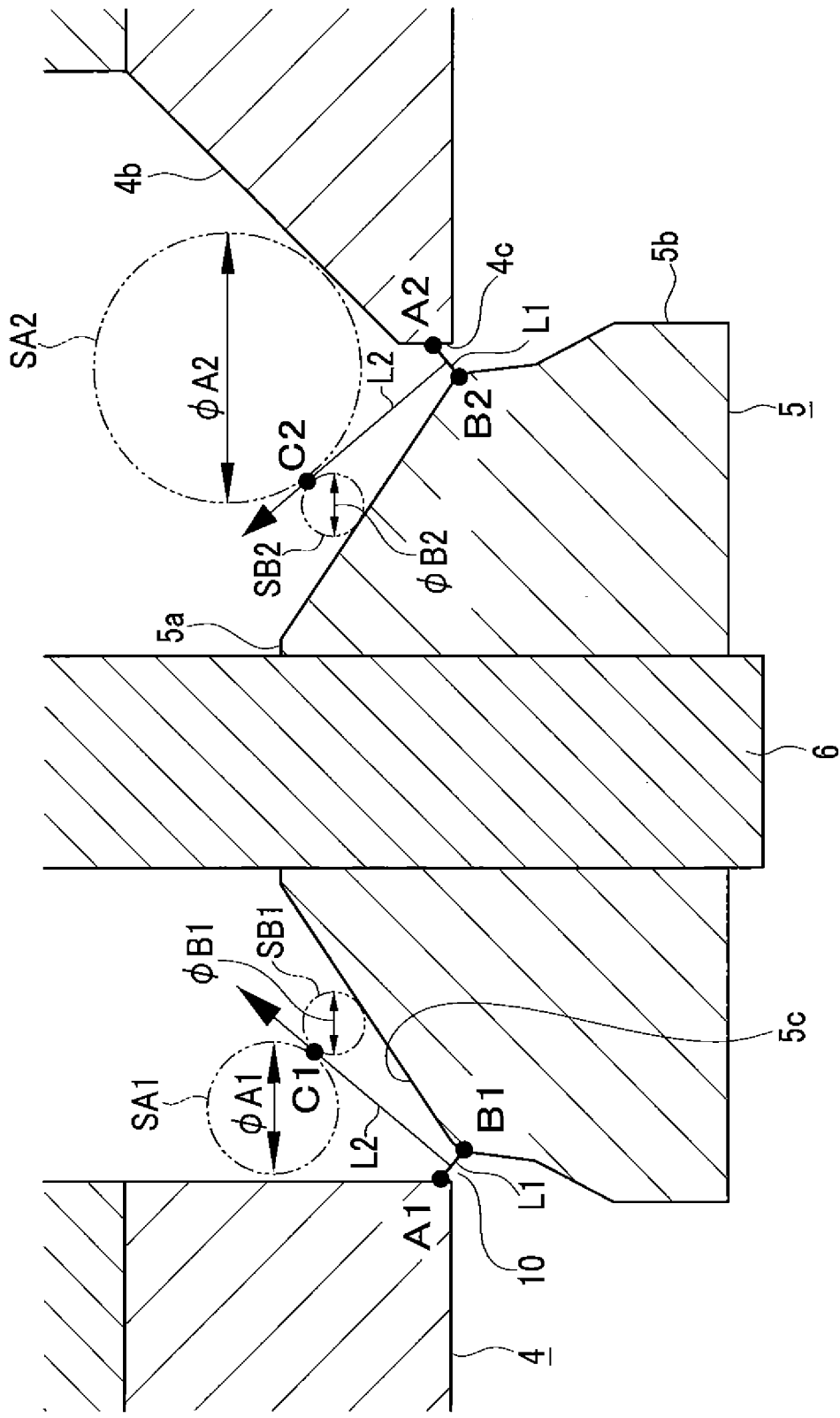
FIG. 8 is a sectional view showing a relationship between a valve seat and a valve element and a valve stem in an EGR valve in a second embodiment.
Figure 9A:
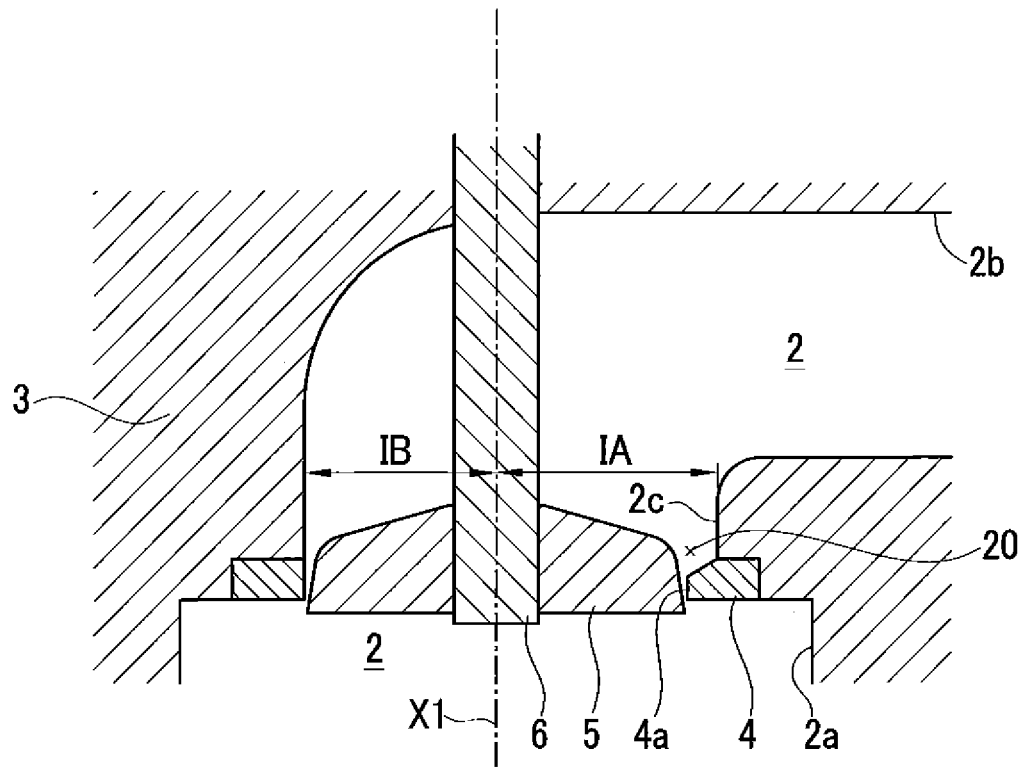
FIG. 9A is a sectional view showing a relationship between a housing, the valve seat, the valve element, and the valve stem in the EGR valve in the second embodiment.
Figure 9B:
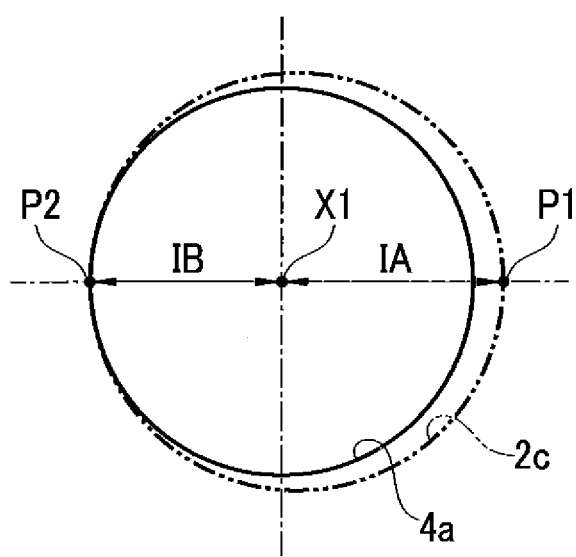
FIG. 9B is a plan view showing differences in shapes in a valve hole of the valve seat and an inner circumferential surface of a passage continuous to the valve seat in the EGR valve in the second embodiment.

FIG. 8 is a sectional view showing a relationship between the valve seat 4, the valve element 5, and the valve stem 6 of the EGR valve 1 in the present embodiment. FIG. 9A is a sectional view showing a relationship between the housing 3, the valve seat 4, the valve element 5, and the valve stem 6 and FIG. 9B is a plan view showing a difference in shape between the valve hole 4a of the valve seat 4 and the inner circumferential surface 2c of the passage 2 continuous to the valve seat 4. The present embodiment differs in the shapes of the valve element 5 and the valve seat 4 from the first embodiment. Specifically, as shown in FIG. 8, diameters of φA1 and φA2 of the first circles SA1 and SA2 respectively defined by first points A1 and A2 and points C1 and C2 are set to be non-uniform in the circumferential direction of the valve element 5. To be concrete, the diameters φA1 and φA2 of the first circles SA1 and SA2 are set so that they become larger as being closer to the exit side of the passage 2, that is, the diameter φA2 on a side closer to the exit 2b (a right side in FIG. 9) is larger than the diameter φA1. The diameters φB1 and φB2 of the second circles SB1 and SB2 respectively defined by the second points B1 and B2 and points C1 and C2 are equal in the circumferential direction of the valve element 5. Furthermore, as shown in FIGS. 9A and 9B, in the housing 3, the inner wall 2c of the passage 2 adjacent to the valve seat 4 is configured such that a first distance between a first part P1 of the inner wall 2c positioned on a nearest side to the exit 2b and an axis X1 of the valve stem 6 is larger than a second distance between a second part P2 of the inner wall 2c positioned on an opposite side and the axis X1.

As explained above, according to the EGR valve 1 in the present embodiment, the diameters φA1 and φA2 of the first circles SA1 and SA2 are not uniform in the circumferential direction of the valve element 5. Accordingly, the flow direction of EGR gas having passed through the measuring section 10 gradually changes to the circumferential direction of the valve element 5, so that an abrupt change of the flow is suppressed. To be concrete, the diameters φA1 and φA2 of the first circles SA1 and SA2 are larger on a side closer to the exit 2b of the passage 2. On the side closer to the exit 2b of the passage 2, that is, on the side corresponding to the first part P1, a recessed section 20 is formed by the valve seat 4 and the inner wall 2c. This allows part of the EGR gas flow passing through the measuring section 10 to escape to the recessed section 20 and causes part of EGR gas flowing at high velocities in the circumferential direction of the valve element 5 to gradually move to the downstream side in the passage 2. Consequently, it is possible to prevent the flow rate of the flow-rate characteristics in the low opening region from abruptly changes. Other operations and effects are similar to those in the first embodiment.

Figure 10:
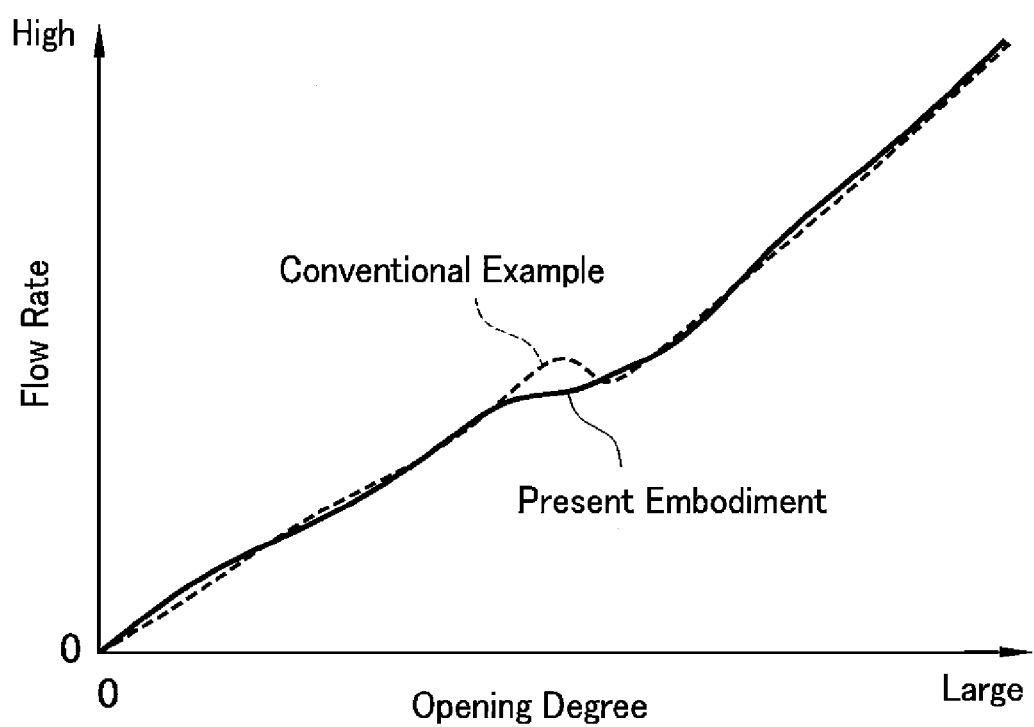
FIG. 10 is a graph showing flow-rate characteristics of EGR gas in a low opening region of the EGR valve in the second embodiment and flow-rate characteristics in the conventional example by comparison.

FIG. 10 is a graph showing the flow-rate characteristics of EGR gas in the low opening region of the EGR valve 1 in the present embodiment and the flow-rate characteristics in the conventional example by comparison. As shown in FIG. 10, the flow-rate characteristics in the conventional example indicated by a broken line exhibits an abrupt change that the flow rate sharply drops once in the course of increasing of the opening degree. On the other hand, the flow-rate characteristics in the present embodiment indicated by a solid line exhibits a gradual change of the flow rate as the opening degree increases in the opening region in which the flow rate in the conventional example abruptly changes.

Third Embodiment

A third embodiment of the EGR valve according to the present invention will be explained in detail below referring to the accompanying drawings.

Figure 11:
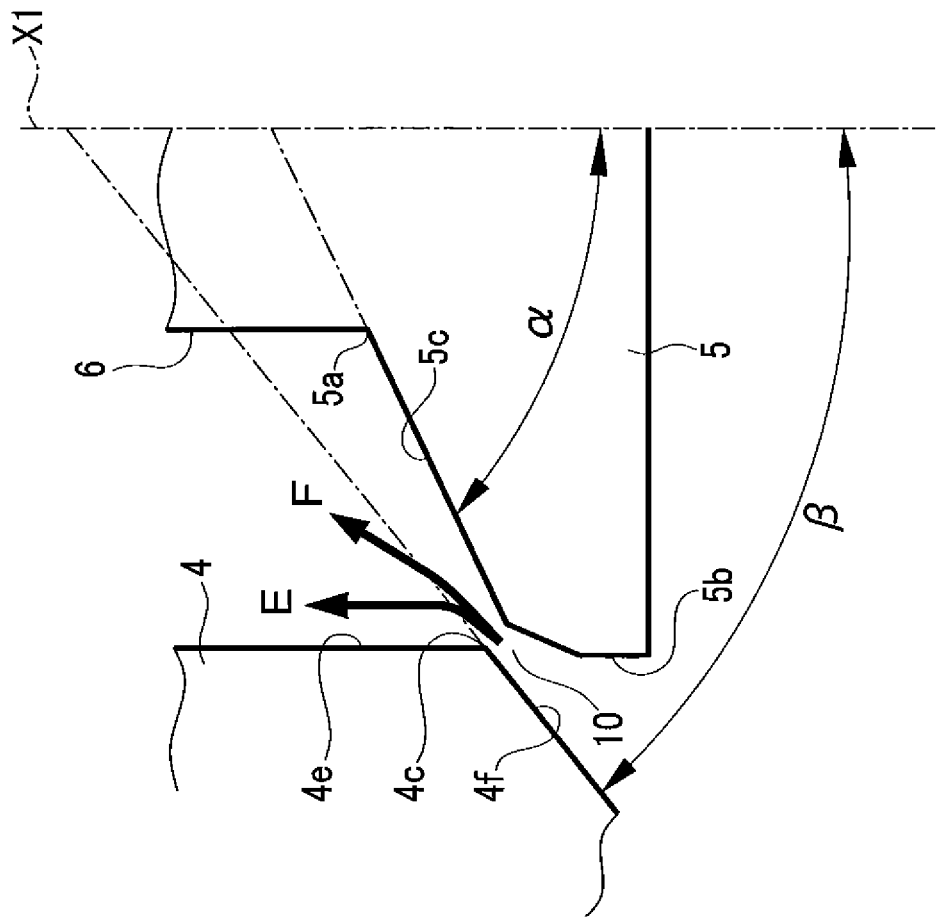
FIG. 11 is a schematic diagram showing a relationship between a valve seat and a valve element in an EGR valve in a third embodiment.
Figure 12:
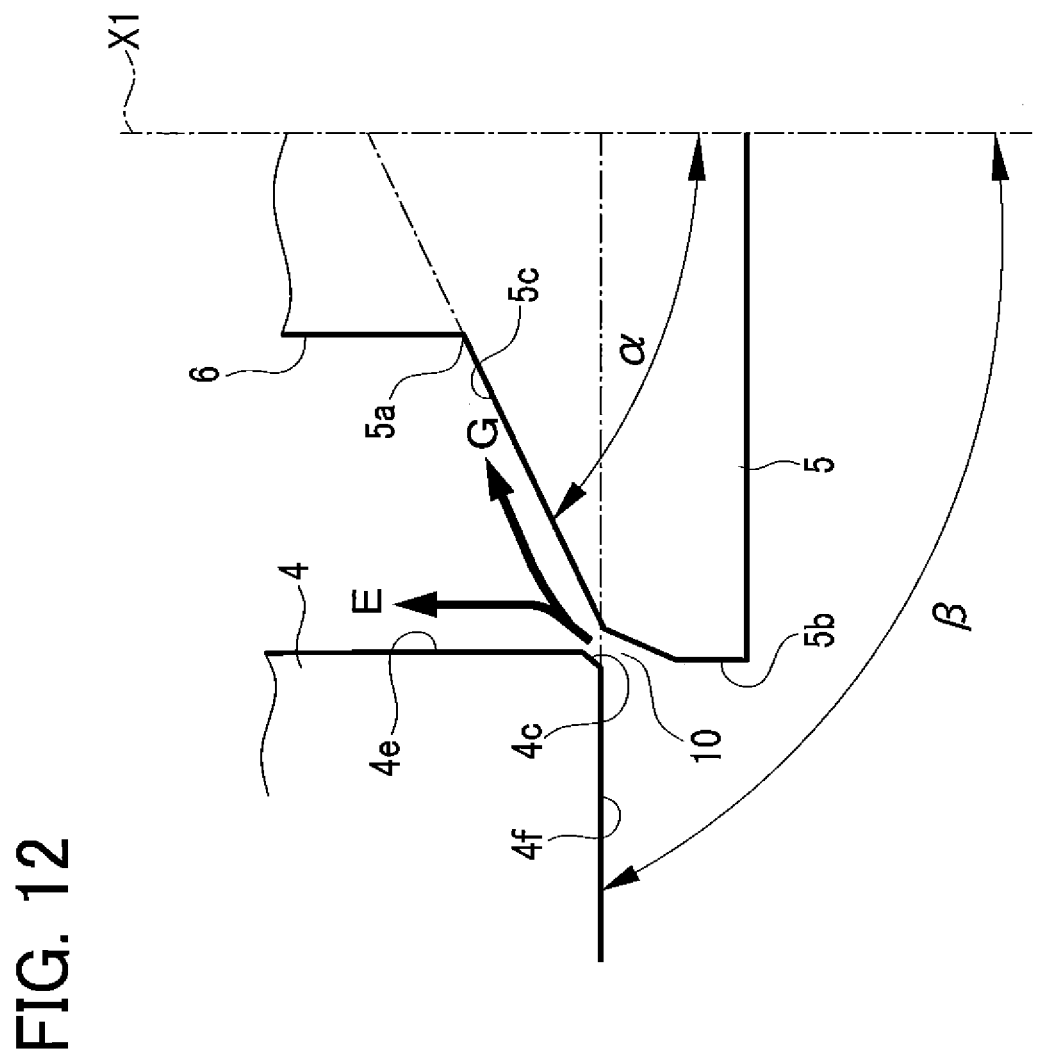
FIG. 12 is a schematic diagram showing a relationship between a valve seat and a valve element in an EGR valve in a comparative example in the third embodiment.
Figure 13:
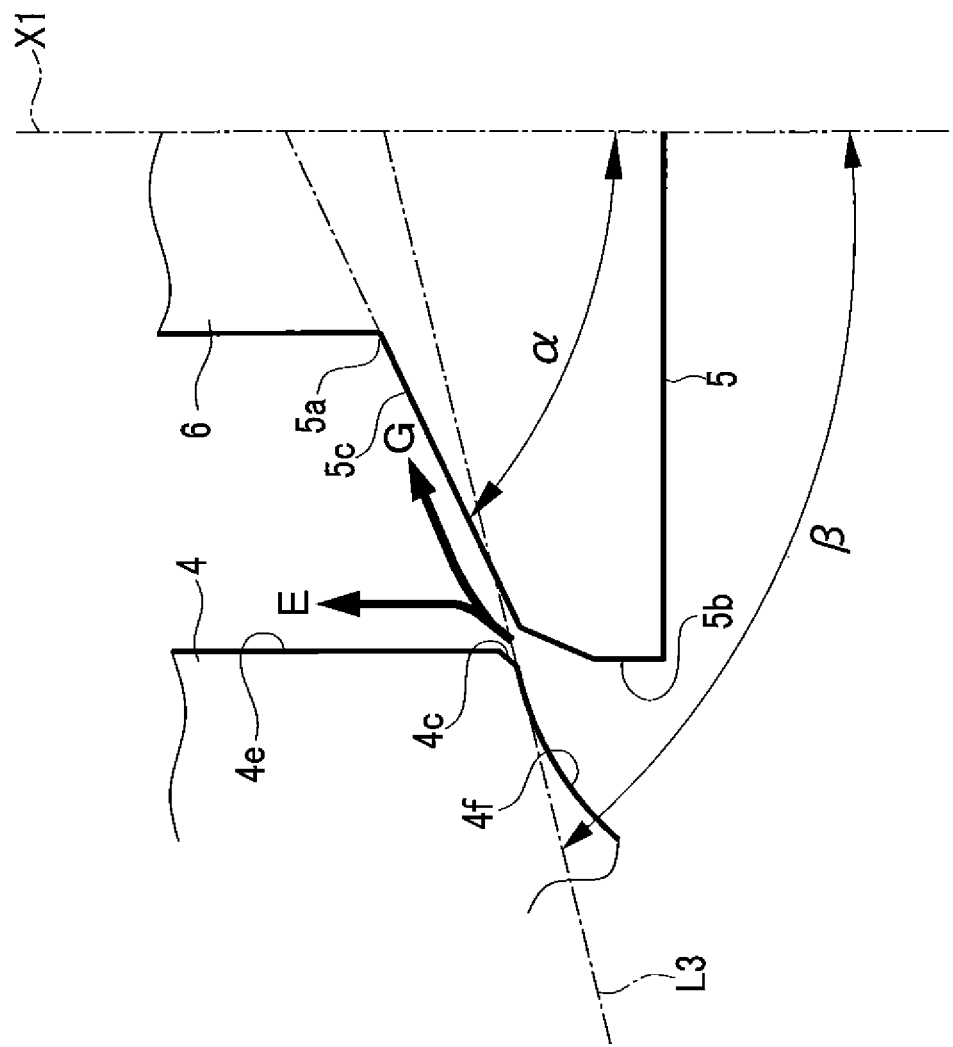
FIG. 13 is a schematic diagram showing a relationship between a valve seat and a valve element in the EGR valve in another comparative example in the third embodiment.

FIG. 11 is a schematic view showing a relationship between the valve seat 4 and the valve element 5 in the EGR valve 1 in the present embodiment; FIG. 12 is a schematic view showing a relationship between a valve seat 4 and a valve element 5 in an EGR valve in a comparative example. FIG. 13 is a schematic view showing a relationship between a valve seat 4 and a valve element 5 in an EGR valve in another comparative example. In FIG. 11, the valve element 5 includes a tapered portion 5c whose diameter gradually decreases toward the minimum-diameter portion 5a. The valve seat 4 is formed so that an inner circumferential surface 4e continuous from an upstream-side inner circumferential edge 4c to a downstream side is parallel to the axis X1 of the valve stem 6, and an inner circumferential surface 4f continuous from the upstream-side inner circumferential edge 4c to a further upstream side is slant so as to intersect the axis X1 of the valve stem 6. Herein, an angle between the tapered portion 5c of the valve element 5 and the axis X1 of the valve stem 6 is referred to as a first angle $\alpha$, and an angle between the inner circumferential surface 4f of the valve seat 4 continuous from the upstream-side inner circumferential edge 4c to the further upstream side and the axis X1 of the valve stem 6 is referred to as a second angle $\beta$. The shapes of the valve element 5 and the valve seat 4 are determined so that the first angle $\alpha$ is larger than the second $\beta$, thereby causing the EGR gas having passed through the measuring section 10 to flow along a midway zone between the valve seat 4 and the valve element 5 and between the valve seat 4 and the valve stem 6 (the flow is indicated by an arrow F) as the opening degree increases in the low opening region. In a case where the opening degree in the low opening region is more slight, the EGR gas having passed through the measuring section 10 is caused to flow along the inner circumferential surface 4e of the valve seat 4 and the inner circumferential surface of the passage 2 (the flow is indicated by an arrow E).

In the comparative example shown in FIG. 12, differently from the present embodiment, the shapes of the valve element 5 and the valve seat 4 are determined so that the first angle $\alpha$ is smaller than the second angle $\beta$ (90°), thereby causing the EGR gas having passed through the measuring section 10 to flow along the valve element 5 and the valve stem 6 (the flow is indicated by an arrow G) as the opening degree increases in the low opening region. In a case where the opening degree in the low opening region is more slight, the EGR gas having passed through the measuring section 10 will flow along the inner circumferential surface 4e of the valve seat 4 and the inner circumferential surface of the passage 2 (the flow is indicated by an arrow E).

When the inner circumferential surface 4f continuous from the upstream-side inner circumferential edge 4c to the further upstream side is curved as shown in FIG. 13, the second angle $\beta$ represents an angle formed between a tangent line L3 tangent to the curved inner circumferential surface 4f, passing through the upstream-side inner circumferential edge 4c, and the axis X1.

In the EGR valve 1 in the present embodiment explained above, the shapes of the valve element 5 and the valve seat 4 are designed so that the first angle $\alpha$ is larger than the second angle $\beta$. Accordingly, in the low opening region of the valve element 5, the EGR gas initially flows along the inner circumferential surface 4e of the valve seat 4 and then comes to flow along the midway zone between the valve seat 4 and the valve element 5 or the valve stem 6, but not along any of the valve seat 4, valve element 5, and valve stem 6, as the opening degree in the low opening region increases. This can prevent an abrupt change in flow rate of the flow-rate characteristics in the low opening region. Other operations and effects are similar to those in the first embodiment.

Figure 14:
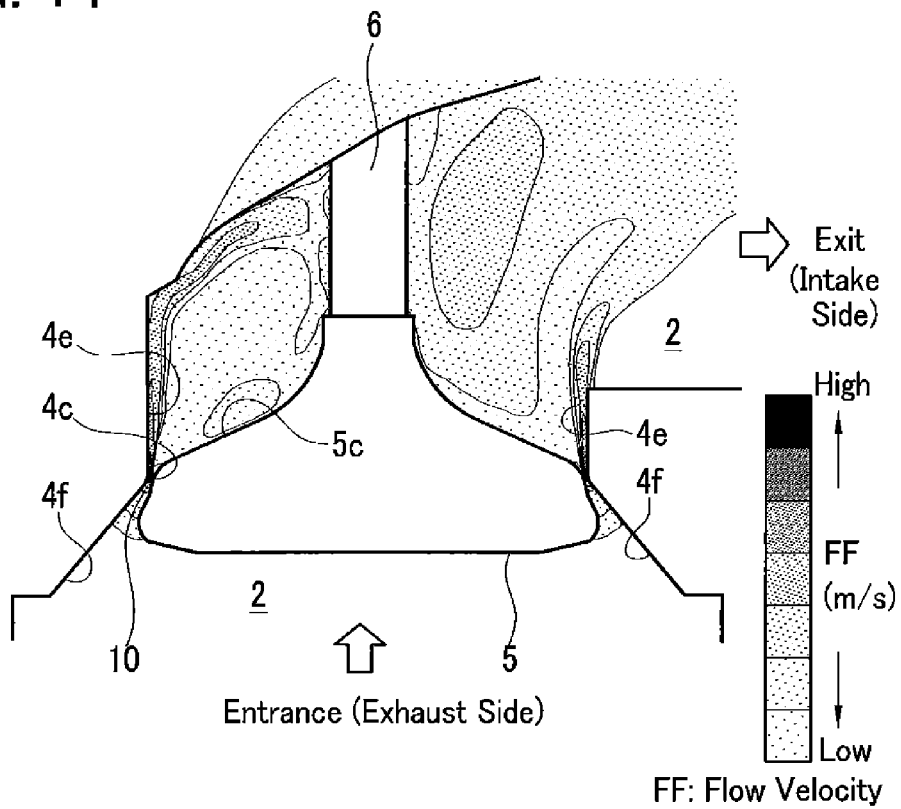
FIG. 14 is an explanatory view showing a CAE analysis result (an EGR gas flow velocity distribution) of an EGR gas flow in a slight open state in a low opening region in the third embodiment.
Figure 15:
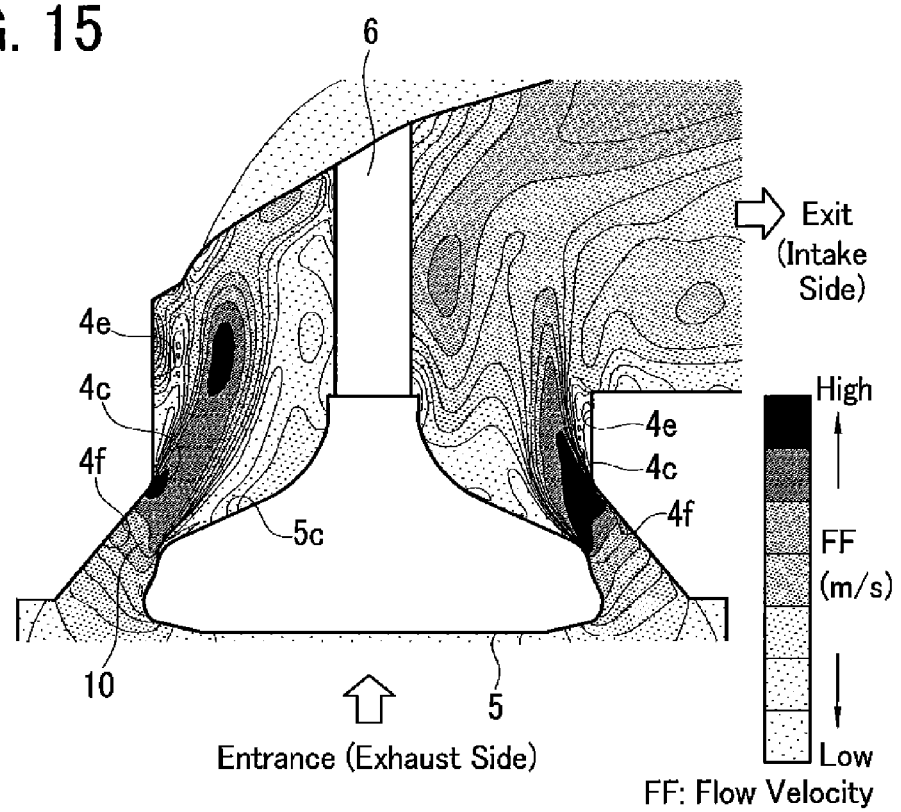
FIG. 15 is an explanatory view showing a CAE analysis result (an EGR gas flow velocity distribution) of an EGR gas flow in a small open state in a low opening region in the third embodiment.
Figure 16:
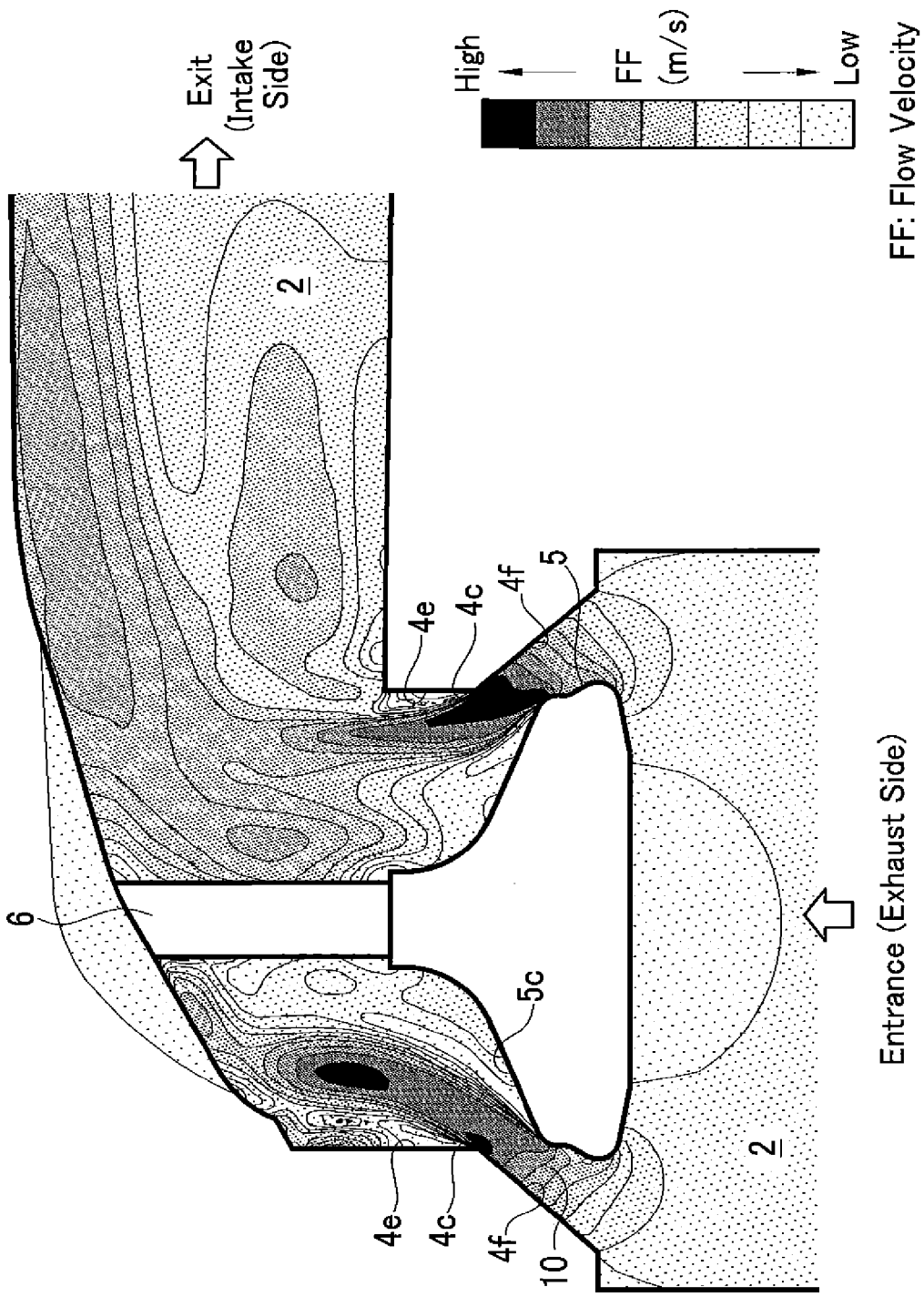
FIG. 16 is an explanatory view showing a CAE analysis result (an EGR gas flow velocity distribution) of an EGR gas flow in a small open state in a low opening region in the third embodiment.
Figure 17:
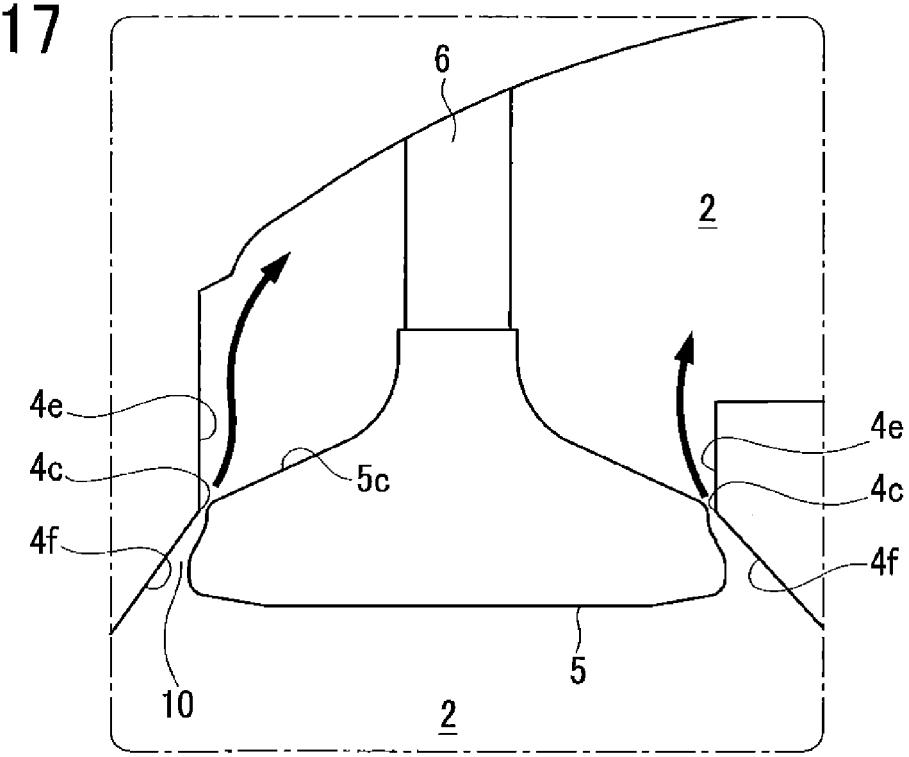
FIG. 17 is a conceptual view showing a flow direction of EGR gas in the slight open state corresponding to FIG. 14 in the third embodiment.
Figure 18:
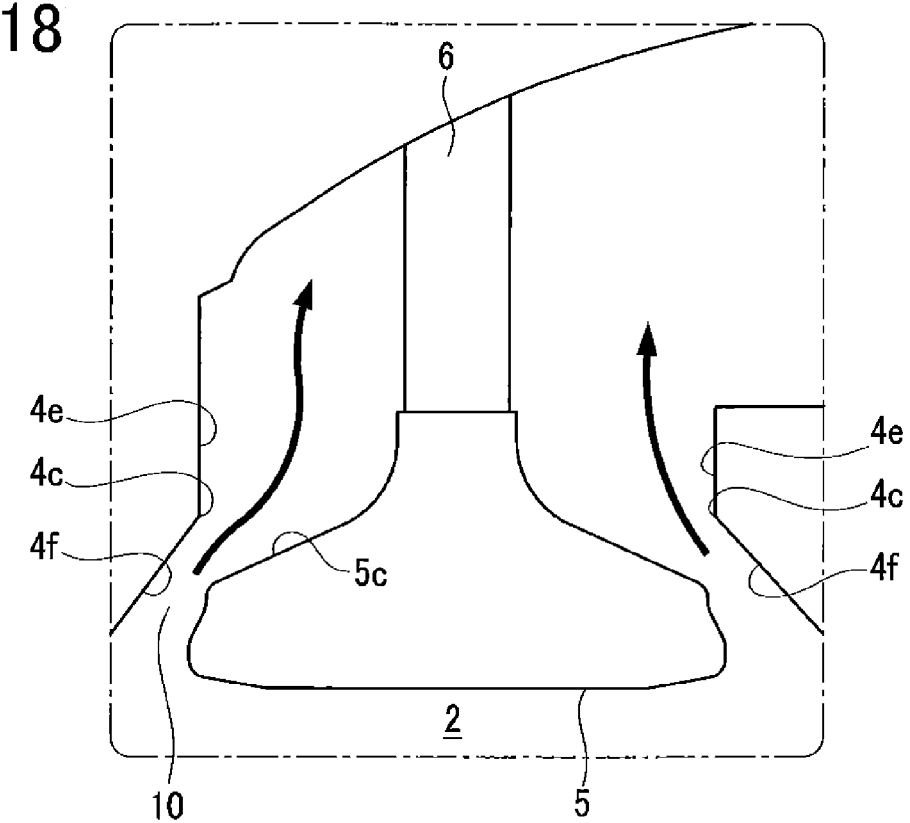
FIG. 18 is a conceptual view showing a flow direction of EGR gas in the small open state corresponding to FIG. 15 in the EGR valve in the third embodiment.

FIG. 14 is an explanatory view showing a CAE analysis result (an EGR gas flow velocity distribution) of EGR gas flow in the slight open state in the low opening region of the EGR valve 1 in the present embodiment. FIGS. 15 and 16 are explanatory views showing a CAE analysis result (an EGR gas flow velocity distribution) of EGR gas flow in the small open state slightly larger than the slight open state of FIG. 14. FIG. 17 is a conceptual view showing the flow direction of EGR gas in the slight open state corresponding to FIG. 14 in the EGR valve 1 in the present embodiment. FIG. 18 is a conceptual view showing the flow direction of EGR gas in the small open state corresponding to FIGS. 15 and 16 in the EGR valve 1 in the present embodiment. In FIG. 14, the EGR gas in the slight open state shows a tendency to flow at higher velocities in a zone along the inner circumferential surface 4e of the valve seat 4. As is shown by FIGS. 15 and 16, the EGR gas shows a tendency to flow at higher velocities in a midway zone between the valve seat 4 and the valve element 5 and between the valve seat 4 and the valve stem 6 when the opening degree of the valve element 5 increases to the small open state. In the low opening region of the valve element 5, as shown in FIG. 17, the flow of EGR gas having passed through the measuring section 10 in the slight open state is directed to the downstream side mainly along the inner circumferential surface 4e of the valve seat 4. As shown in FIG. 18, the flow of EGR gas having passed through the measuring section 10 in the small open state is directed to the downstream side mainly along the midway zone between the valve seat 4 and the valve element 5 or the valve stem 6.

Figure 19:
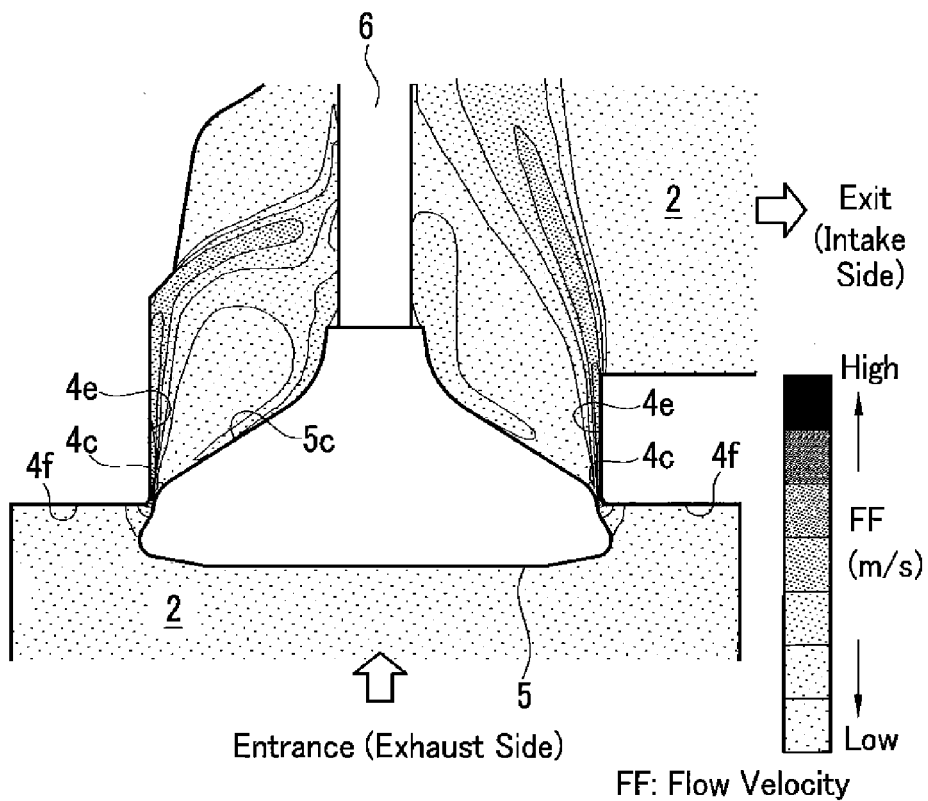
FIG. 19 is an explanatory view showing a CAE analysis result (an EGR gas flow velocity distribution) of an EGR gas flow in a slight open state in a low opening region in the comparative example in the third embodiment.
Figure 20:
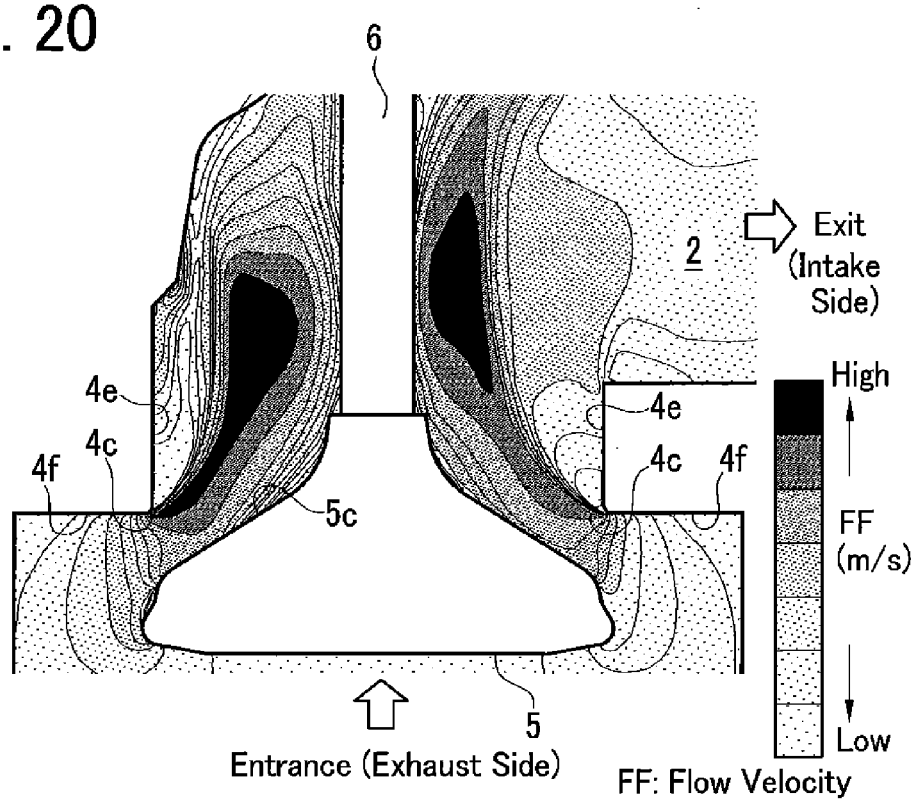
FIG. 20 is an explanatory view showing a CAE analysis result (an EGR gas flow velocity distribution) of an EGR gas flow in the small open state in the low opening region in the comparative example in the third embodiment.
Figure 21:
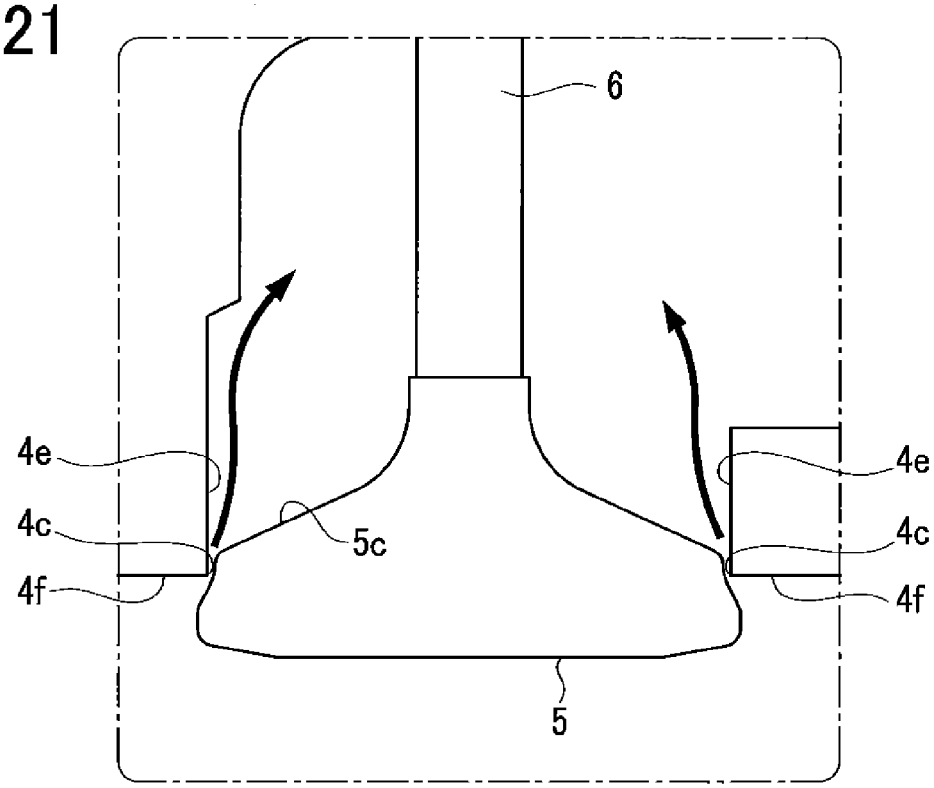
FIG. 21 is a conceptual view showing a flow direction of EGR gas in the slight open state corresponding to FIG. 19 in the comparative example in the third embodiment.
Figure 22:
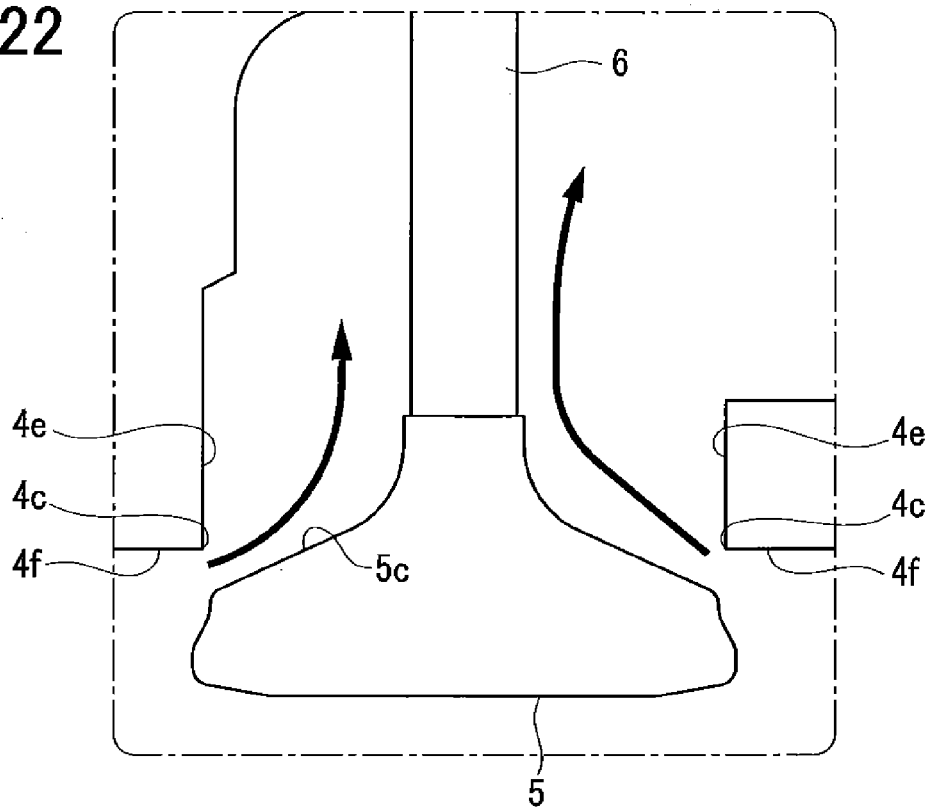
FIG. 22 is a conceptual view showing a flow direction of EGR gas in the small open state corresponding to FIG. 20 in the comparative example in the third embodiment.

FIG. 19 is an explanatory view showing a CAE analysis result (EGR gas velocity distribution) of EGR gas flow in the slight open state of the low opening region in the EGR valve in the comparative example. FIG. 20 is an explanatory view of a CAE analysis result (EGR gas velocity distribution) of EGR gas flow in the small open state slightly larger than the slight open state of FIG. 19. FIG. 21 is a conceptual view showing the flow direction of EGR gas in the slight open state corresponding to FIG. 19 in the EGR valve in the comparative example. FIG. 22 is a conceptual view showing the flow direction of EGR gas in the small open state corresponding to FIG. 20 in the EGR valve in the comparative example. In FIG. 19, the EGR gas in the slight open state shows a tendency to flow at higher velocities in the zone along the inner circumferential surface 4e of the valve seat 4. When the opening degree of the valve element 5 increases as in FIG. 20, this tendency changes to a tendency that the EGR gas flows flow at high velocities along the valve element 5 and the valve stem 6. Specifically, in the low opening region of the valve element 5, the EGR gas having passed through the measuring section 10 flows to the downstream side mainly along the inner circumferential surface 4e of the valve seat 4 in the slight open state as shown in FIG. 21, and then flows to the downstream side while maintaining the high velocities mainly along the valve element 5 and the valve stem 6 in the small open state as shown in FIG. 22.

Figure 23:
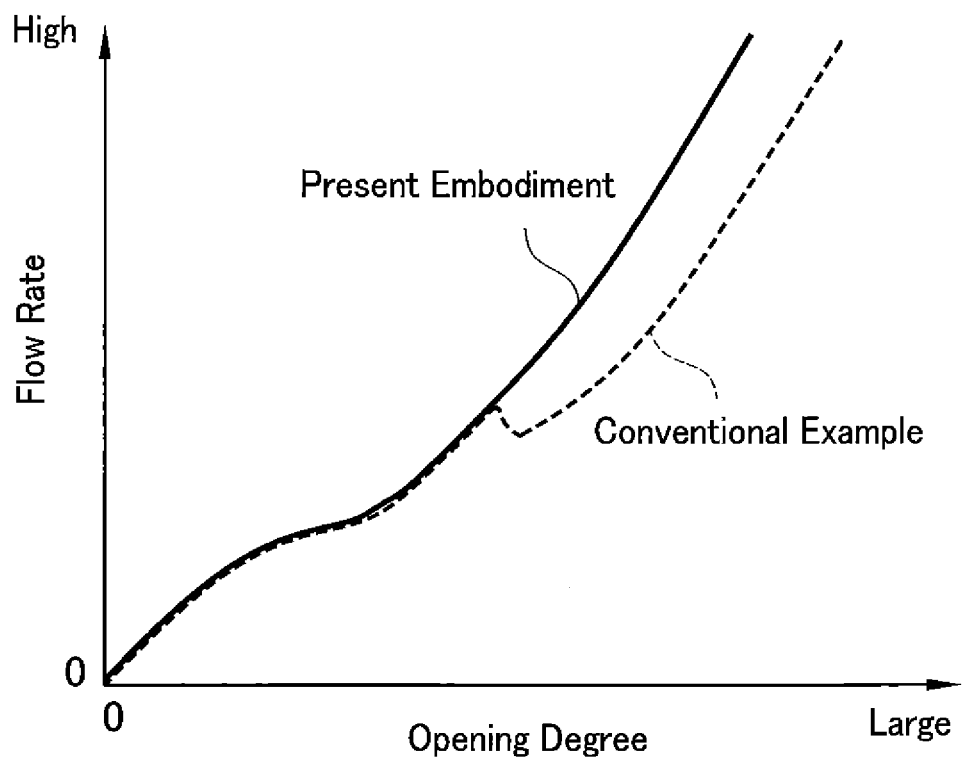
FIG. 23 is a graph showing the flow-rate characteristics of EGR gas in the low opening region in the EGR valve and the flow-rate characteristics in the conventional example in the third embodiment.
Figure 24:
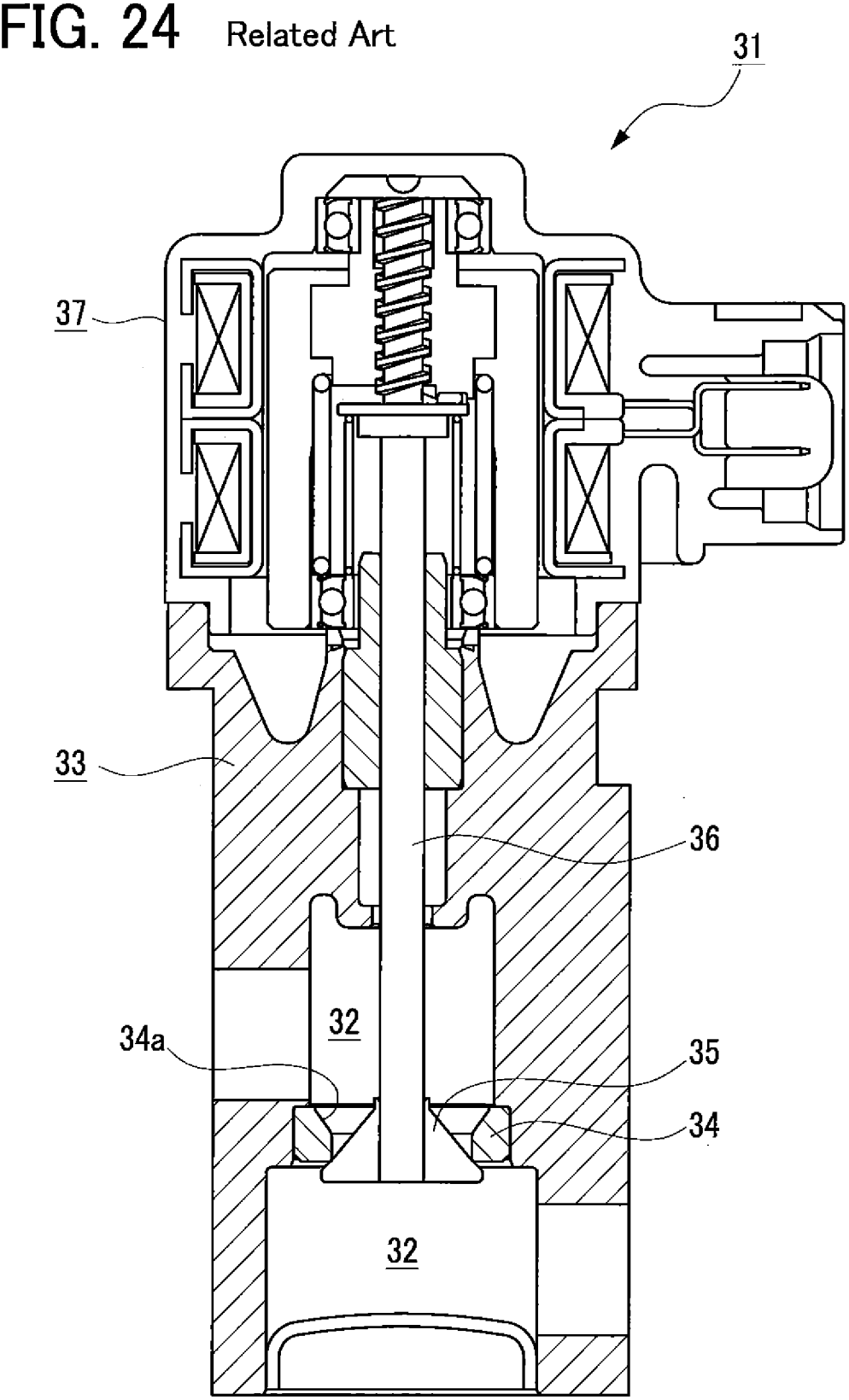
FIG. 24 is a sectional view of an EGR valve in a fully closed state in a conventional example.
Figure 25:
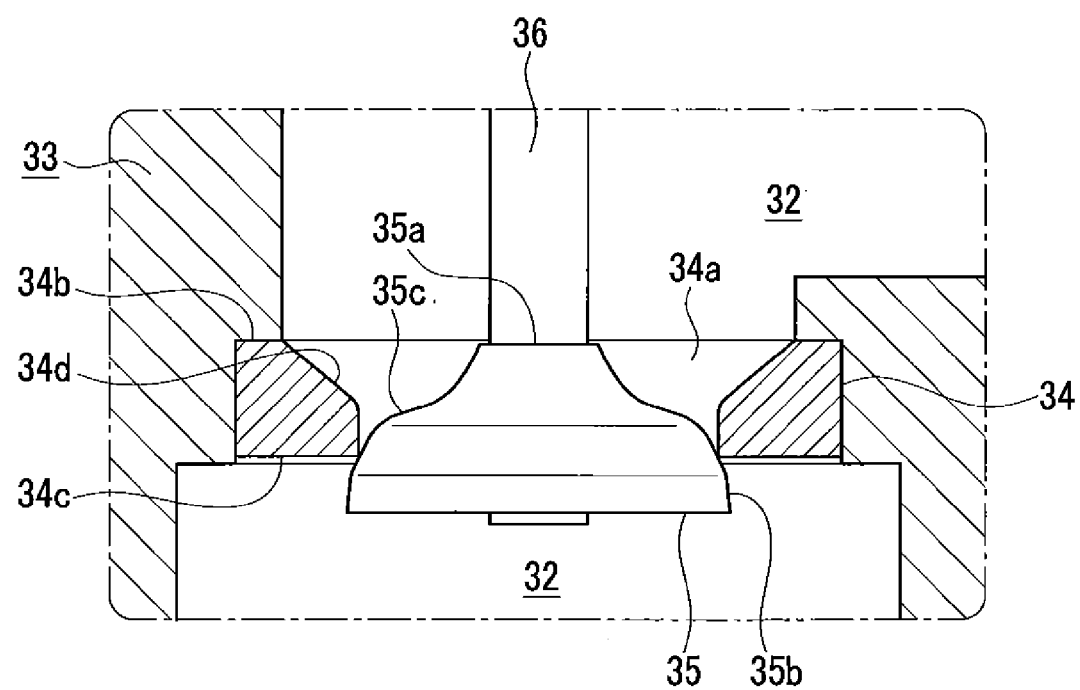
FIG. 25 is a sectional view showing a relationship in shape between a valve seat and a valve element in the EGR valve in the conventional example.
Figure 26:
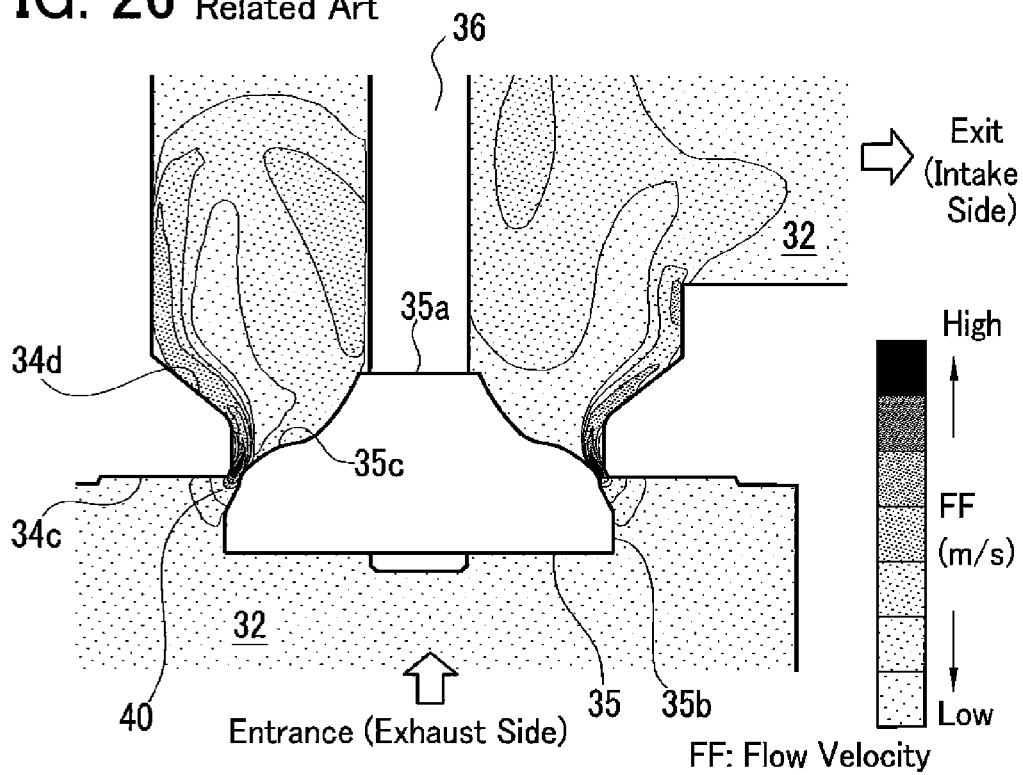
FIG. 26 is an explanatory view showing a CAE analysis result (an EGR gas flow velocity distribution) of an EGR gas flow in the slight open state in the low opening region in the conventional example.

FIG. 23 is a graph showing the flow-rate characteristics of EGR gas in the low opening region of the EGR valve 1 in the present embodiment and the flow-rate characteristics in the conventional example by comparison. As shown in FIG. 23, the flow-rate characteristics in the conventional example indicated by a broken line exhibits an abrupt change that the flow rate sharply drops once in the course of increasing of the opening degree. On the other hand, the flow-rate characteristics in the present embodiment indicated by a solid line smoothly changes in a curve as a whole continuously from the curve in the slight open state without abruptly changing the flow rate in the course of increasing of the opening degree.

The present invention is not limited to the above embodiments and may be embodied in other specific forms without departing from the essential characteristics thereof.

In each of the above embodiments, the actuator 7 is a step motor. As an alternative, for instance, the actuator may be a diaphragm actuator.

INDUSTRIAL APPLICABILITY

The present invention is applicable to an EGR apparatus to be provided in a gasoline engine and a diesel engine.

REFERENCE SIGNS LIST

1 EGR valve
2 Passage
3 Housing
4 Valve seat
4a Valve hole
4b Inner circumferential surface
4c Upstream-side inner circumferential edge
4d Downstream-side inner circumferential edge
4f Inner circumferential surface
5 Valve element
5a Minimum-diameter portion
5b Maximum-diameter portion
5c Tapered portion
6 Valve stem
10 Measuring section
A First point
A1 First point
A2 First point
B Second point
B1 Second point
B2 Second point
C One point
C1 One point
C2 One point
L1 Line segment
L2 Perpendicular bisector
SA First circle
SA1 First circle
SA2 First circle
SB Second circle
SB1 Second circle
SB2 Second circle
$\phi$A Diameter
$\phi$A1 Diameter
$\phi$A2 Diameter
$\phi$B Diameter
$\phi$B1 Diameter
$\phi$B2 Diameter
lA First distance
lB Second distance

What is claimed is:

1. An exhaust gas recirculation valve comprising:
a housing including a passage for exhaust recirculation gas;
a valve seat provided in the passage, the valve seat having a valve hole including an inner circumferential surface, the inner circumferential surface including an upstream-side inner circumferential edge and a downstream-side inner circumferential edge;
a valve element seated on the valve seat, the valve element being configured to form a measuring section for the exhaust recirculation gas between the valve element and the valve seat, the valve element having an approximately umbrella shape, the valve element including a minimum-diameter portion and a maximum-diameter portion; and
a valve stem having an end portion at which the valve element is provided, wherein
the valve element is placed inside the valve hole and is movable together with the valve stem between: (i) a fully closed position, where a portion of the valve element near the maximum-diameter portion is in contact with the upstream-side inner circumferential edge of the valve hole, and (ii) a fully open position, where the maximum-diameter portion is disposed farthest from the upstream-side inner circumferential edge in an axial direction of the valve seat;
the exhaust gas recirculation valve is configured to move the valve element together with the valve stem with respect to the valve seat in order to change an open area of the measuring section and in order to change an opening degree of the valve element to adjust a flow rate of the exhaust recirculation gas in the passage, and the valve has flow-rate characteristics of high resolution in a low opening region of the valve element and flow-rate characteristics of large flow rate in a high opening region;
the valve element and the valve seat have predetermined shapes to cause the flow-rate characteristics in the low opening region to change in a curve without a step;
when a line segment joining a first point on the inner circumferential surface of the valve hole and a second point on a surface of the valve element in the low opening region is a minimum distance, and a first circle is tangent to a first point located on a perpendicular bisector drawn to the line segment and the inner circumferential surface of the valve hole, and a second circle is tangent to a second point located on the perpendicular bisector and the surface of the valve element, and
the shapes of the valve element and the valve seat are configured such that the first circle has a diameter equal to or larger than the second circle to cause the exhaust recirculation gas, after passing the measuring section, to flow along the valve element and the valve stem.

2. The exhaust gas recirculation valve according to claim 1, wherein the valve seat is configured such that a portion of the inner circumferential surface of the valve hole is tapered with an inner diameter gradually increasing toward the downstream-side inner circumferential edge.

3. The exhaust gas recirculation valve according to claim 2, wherein the diameter of the first circle is nonuniform in a circumferential direction of the valve element.

4. The exhaust gas recirculation valve according to claim 3, wherein the diameter of the first circle is larger as the first circle becomes closer to an exit side of the passage.

5. The exhaust gas recirculation valve according to claim 1, wherein
- the valve element includes a tapered portion with an outer diameter gradually decreasing toward the minimum-diameter portion; and
- when an angle between the tapered portion of the valve element and an axis of the valve stem is a first angle, and an angle between an inner circumferential surface of the valve seat continuous from the upstream-side inner circumferential edge to a further upstream side and the axis of the valve stem is a second angle, the shapes of the valve element and the valve seat are determined so that the first angle is larger than the second angle to cause the exhaust recirculation gas after passing through the measuring section to flow along a midway zone between the valve seat and the valve element and between the valve seat and the valve stem.

* * * * *